US009992190B2

(12) United States Patent
Kikuchi et al.

(10) Patent No.: US 9,992,190 B2
(45) Date of Patent: Jun. 5, 2018

(54) MULTI-PARTY SECURE AUTHENTICATION SYSTEM, AUTHENTICATION SERVER, INTERMEDIATE SERVER, MULTI-PARTY SECURE AUTHENTICATION METHOD, AND PROGRAM

(71) Applicant: NIPPON TELEGRAPH AND TELEPHONE CORPORATION, Chiyoda-ku (JP)

(72) Inventors: Ryo Kikuchi, Musashino (JP); Dai Ikarashi, Musashino (JP); Koji Chida, Musashino (JP); Koki Hamada, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 95 days.

(21) Appl. No.: 14/910,808

(22) PCT Filed: Aug. 21, 2014

(86) PCT No.: PCT/JP2014/071873
§ 371 (c)(1),
(2) Date: Feb. 8, 2016

(87) PCT Pub. No.: WO2015/025916
PCT Pub. Date: Feb. 26, 2015

(65) Prior Publication Data
US 2016/0197906 A1    Jul. 7, 2016

(30) Foreign Application Priority Data

Aug. 22, 2013 (JP) ................................. 2013-172032

(51) Int. Cl.
*H04L 29/06* (2006.01)
*H04L 9/08* (2006.01)
(Continued)

(52) U.S. Cl.
CPC .............. *H04L 63/083* (2013.01); *G09C 1/00* (2013.01); *H04L 9/085* (2013.01); *H04L 9/3226* (2013.01); *H04L 2209/46* (2013.01)

(58) Field of Classification Search
USPC .......................................... 713/168
See application file for complete search history.

(56) References Cited

U.S. PATENT DOCUMENTS 5,708,714 A * 1/1998 Lopez ..................... H04L 9/085
380/286
6,959,394 B1 * 10/2005 Brickell ............... G06Q 20/206
380/44

(Continued)

OTHER PUBLICATIONS 3-partySetting.pdf; bagherzandi.pdf; Fingerprint based—Bennett etal.pdf; JanCamenisch.pdf; RonCramer.pdf; Zuzana.pdf.*

(Continued)

*Primary Examiner* — Taghi Arani
*Assistant Examiner* — Badri Champakesan
(74) *Attorney, Agent, or Firm* — Oblon, McClelland, Maier & Neustadt, L.L.P.

(57) ABSTRACT

Even when an intermediate server exists, a plurality of servers simultaneously authenticates a user securely. A user apparatus disperses a password. The user apparatus obtains a ciphertext, which is obtained by encrypting a dispersed value. The intermediate server transmits the ciphertext to an authentication server. The authentication server decrypts the ciphertext to obtain the dispersed value. The authentication server determines a verification value. The authentication server obtains a ciphertext. The intermediate server decrypts the ciphertext to obtain the verification value. The intermediate server verifies whether a sum total of the verification values is equal to 0 or not. The authentication server determines a verification value. The authentication server obtains a ciphertext. The authentication server decrypts the (Continued)

ciphertext to obtain the verification value. The authentication server verifies whether a sum total of the verification values is equal to 0 or not.

13 Claims, 21 Drawing Sheets

(51) Int. Cl.
*H04L 9/32* (2006.01)
*G09C 1/00* (2006.01)

(56) References Cited

U.S. PATENT DOCUMENTS

| | | | | |
|---|---|---|---|---|
| 7,392,385 | B2* | 6/2008 | Yoshimura | H04L 63/0428 713/168 |
| 8,171,101 | B2* | 5/2012 | Gladwin | H04L 67/1097 370/242 |
| 9,219,708 | B2* | 12/2015 | Anati | G06F 21/445 |
| 9,270,655 | B1* | 2/2016 | Juels | H04L 9/12 |
| 9,413,531 | B2* | 8/2016 | Takashima | H04L 9/3093 |
| 2003/0221102 | A1* | 11/2003 | Jakobsson | H04L 9/0844 713/171 |
| 2006/0149962 | A1* | 7/2006 | Fountain | H04L 63/0428 713/151 |
| 2007/0266236 | A1* | 11/2007 | Colditz | H04L 63/0428 713/153 |
| 2008/0080709 | A1* | 4/2008 | Michtchenko | H04L 9/0618 380/44 |
| 2009/0019540 | A1* | 1/2009 | Itsik | G06F 21/31 726/18 |
| 2009/0177894 | A1 | 7/2009 | Orsini et al. | |
| 2010/0058449 | A1* | 3/2010 | Kamakura | H04L 63/08 726/6 |
| 2010/0064354 | A1* | 3/2010 | Irvine | G06F 21/6218 726/5 |
| 2013/0275773 | A1 | 10/2013 | Orsini et al. | |
| 2015/0295908 | A1 | 10/2015 | O'Hare et al. | |

OTHER PUBLICATIONS

14/910,808—NPL search results.pdf, 14/910,808—Search strategy. pdf, 14/910,808—patent search results.pdf, 14/910,808—potential search references.pdf.*

Gembu Morohashi, et al., "Secure Authentication Protocol for Practical Multi-Party Computation / Secret Sharing Scheme Systems," The 30$^{th}$ Symposium on Cryptography and Information Security, 2013,10 pages (with partial English translation).

Wakaha Ogata, "Improvement of IT-secure password-protected secret sharing," The 30$^{th}$ Symposium on Cryptography and Information Security, Jan. 22, 2013, 9 pages (with partial English translation).

Jan Camenisch, et al., "Practical Yet Universally Composable Two-Server Password-Authenticated Secret Sharing," ACM Conference on Computer and Communications Security, 2012, 27 pages.

Ryo Kikuchi, et al., "Unconditionally Secure Password-Based Authentication for Multiparty Systems," Computer Security Symposium, 2013, 11 pages.

Ali Bagherzandi, et al., "Password-Protected Secret Sharing," ACM Conference on Computer and Communications Security, 2011, 11 pages.

Ronald Cramer, et al., "Share conversion, pseudorandom secret-sharing and applications to secure distributed computing," TCC, vol. 3378 of Lecture Notes in Computer Science, 2005, 21 pages.

Zuzana Beerliova-Trubiniova, et al., "Perfectly-Secure MPC with Linear Communication Complexity," TCC, vol. 4948 of Lecture Notes in Computer Science, 2008, 18 pages.

International Search Report dated Nov. 11, 2014 in PCT/JP14/71873 filed Aug. 21, 2014.

Extended European Search Report dated Feb. 13, 2017 in Patent Application No. 14838104.9.

Ryo Kikuchi, et al., "Practical Password-Based Authentication Protocol for Secret Sharing Based Multiparty Computation" Network and Parallel Computing, Springer International Publishing, XP047326753, Nov. 20, 2015, pp. 179-196.

Japanese Office Action dated Aug. 9, 2016 in Patent Application No. 2015-532894 (with English language translation).

* cited by examiner

MULTI-PARTY SECURE AUTHENTICATION SYSTEM, AUTHENTICATION SERVER, INTERMEDIATE SERVER, MULTI-PARTY SECURE AUTHENTICATION METHOD, AND PROGRAM

TECHNICAL FIELD

This invention relates to a technique for a plurality of servers to simultaneously authenticate a user securely in authentication on a network.

BACKGROUND ART

As a technique for a user to be securely authenticated simultaneously by each server when the user receives a service in which a plurality of servers are involved, techniques described in Non-patent literatures 1 to 3 are known (see, for example, Non-patent literatures 1 to 3). The techniques described in Non-patent literatures 1 to 3 are authentication techniques in a secure storage service, in which a user sets a password, and data is dispersed and stored in a plurality of servers by a secure method called secret sharing. If a password inputted at the time of authentication is correct, the user can reconstruct correct data. If the password is wrong, the user fails in reconstruction.

PRIOR ART LITERATURE

Non-Patent Literature

Non-patent literature 1: Ali Bagherzandi, Stanislaw Jarecki, Nitesh Saxena, and Yanbin Lu, "Password-protected secret sharing", ACM Conference on Computer and Communications Security, pp. 433-444, 2011.

Non-patent literature 2: Jan Camenisch, Aima Lysyanskaya, and Gregory Neven, "Practical yet universally composable two-server password-authenticated secret sharing", ACM Conference on Computer and Communications Security, pp. 525-536, 2012.

Non-patent literature 3: Wakaha Ogata, "Improvement of IT-secure password-protected secret sharing", SCIS 2013

SUMMARY OF THE INVENTION

Problems to be Solved by the Invention

In prior-art techniques, however, it is assumed that a user is directly connected to a storage server, and it is not possible to ensure security in the case where an intermediate server as a gateway exists like a Web server in a Web service and the like. Further, there is also a problem that the prior-art techniques cannot be applied to services other than a storage service.

An object of the present invention is to provide a multi-party secure authentication technique capable of ensuring security even in the case where an intermediate server exists.

Means to Solve the Problems

In order to solve the above problem, a multi-party secure authentication method of a first aspect of this invention comprises a password dispersing step, a dispersed password value encrypting step, a dispersed password value transferring step, a dispersed password value decrypting step, an intermediate server's verification value generating step, an intermediate server's verification value encrypting step, an intermediate server's verification value decrypting step, an intermediate server's verifying step, an authentication server's verification value generating step, an authentication server's verification value encrypting step, an authentication server's verification value decrypting step and an authentication server's verifying step.

It is assumed below that: $n \geq 3$ is satisfied; $2k-1 \leq n$ is satisfied; $k \leq m$ is satisfied; $m \leq n$ is satisfied; $a_1, \ldots, a_m$ are m different integers each of which is equal to or larger than 1 and equal to or smaller than n; (k, n) secret sharing is secret sharing in which reconstruction is possible if there are k or more dispersed values among n dispersed values; $[r^{(W)}]_1, \ldots, [r^{(W)}]_n$ are such dispersed values by the (k, n) secret sharing that a random number $r^{(W)}$ is obtained when $[r^{(W)}]_1, \ldots, [r^{(W)}]_n$ are reconstructed; $[r^{(i)}]_1, \ldots, [r^{(i)}]_n$ (i=1, ..., n) are such dispersed values by the (k, n) secret sharing that a random number $r^{(i)}$ is obtained when $[r^{(i)}]_1, \ldots, [r^{(i)}]_n$ are reconstructed; $[0^{(W)}]_1, \ldots, [0^{(W)}]_n$ are such dispersed values by the (k, n) secret sharing that 0 is obtained when $[0^{(W)}]_1, \ldots, [0^{(W)}]_n$ are reconstructed; and $[0^{(a\_i)}]_1, \ldots, [0^{(a\_i)}]_n$ (i=1, ..., m) are such dispersed value by the (k, n) secret sharing that 0 is obtained when $[0^{(a\_i)}]_1, \ldots, [0^{(a\_i)}]_n$ are reconstructed.

At the password dispersing step, a user apparatus disperses an inputted password w' into n dispersed values $[w']_1, \ldots, [w']_n$. At the dispersed password value encrypting step, the user apparatus obtains a ciphertext $Enc_{US\_i}([w']_i)$, which is obtained by encrypting a dispersed value $[w']_i$, using a common key between the user apparatus and an i-th authentication server, for i=1, ..., n. At the dispersed password value transferring step, an intermediate server transmits the ciphertext $Enc_{US\_i}([w']_i)$ received from the user apparatus to the i-th authentication server, for i=1, ..., n. At the dispersed password value decrypting step, the authentication server decrypts the ciphertext $Enc_{US\_i}([w']_i)$ received from the intermediate server to obtain the dispersed value $[w']_i$, using a common key between the user apparatus and the authentication server. At the intermediate server's verification value generating step, on the assumption that: $\lambda_{a\_i}^{(W)}$ (i∈1, ..., m) indicates a constant satisfying the following formula:

[Formula 1]

$$r^{(W)}w = \sum_{i=1}^{m} \lambda_{a_i}^{(W)} [r^{(W)}]_{a_i} [w]_{a_i}$$

$\hat{\lambda}_{a\_i}^{(W)}$ (i∈1, ..., m) indicates a constant satisfying the following formula:

[Formula 2]

$$0 = \sum_{i=1}^{m} \hat{\lambda}_{a_i}^{(W)} [0^{(W)}]_{a_i}$$

$\lambda_{a\_i}^{(j)}$ (i∈1, ..., m) indicates a constant satisfying the following formula:

[Formula 3]

$$r^{(j)}w = \sum_{i=1}^{m} \lambda_{a_i}^{(j)} [r^{(j)}]_{a_i} [w]_{a_i}$$

and $\hat{\lambda}_{a\_i}^{(j)}(i \in 1, \ldots, m)$ indicates a constant satisfying the following formula:

[Formula 4]
$$0 = \sum_{i=1}^{m} \hat{\lambda}_{a_i}^{(j)} [0^{(j)}]_{a_i}$$

the authentication server determines a verification value $q_{a\_i}^{(W)}$ by the following formula:

$$q_{a_i}^{(W)} = \lambda_{a_i}^{(W)} [r^{(W)}]_{a_i} ([w]_{a_i} - [w']_{a_i}) + \hat{\lambda}_{a_i}^{(W)} [0^{(W)}]_{a_i} \quad \text{[Formula 5]}$$

At the intermediate server's verification value encrypting step, the authentication server obtains a ciphertext $\text{Enc}_{WS\_a\_i}(q_{a\_i}^{(W)})$, which is obtained by encrypting the verification value $q_{a\_i}^{(W)}$, using a common key between the intermediate server and the authentication server. At the intermediate server's verification value decrypting step, the intermediate server decrypts the ciphertext $\text{Enc}_{WS\_a\_i}(q_{a\_i}^{(W)})$ received from an $a_i$-th one of the authentication servers to obtain a verification value $q_{a\_i}^{(W)}$, using a common key between the intermediate server and the $a_i$-th authentication server, for $i=1, \ldots, m$. At the intermediate server's verifying step, the intermediate server verifies whether a sum total of the verification values $q_{a\_1}^{(W)}, \ldots, q_{a\_m}^{(W)}$ is equal to 0 or not. At the authentication server's verification value generating step, the authentication server determines a verification value $q_{a\_i}^{(a\_j)}$, for $j=1, \ldots, m$, by the following formula:

$$q_{a_i}^{(aj)} = \lambda_{a_i}^{(aj)} [r^{(aj)}]_{a_i} ([w]_{a_i} - [w']_{a_i}) + \hat{\lambda}_{a_i}^{(aj)} [0^{(aj)}]_{a_i} \quad \text{[Formula 6]}$$

At the authentication server's verification value encrypting step, the authentication server obtains a ciphertext $\text{Enc}_{S\_a\_iS\_a\_j}(q_{a\_i}^{(a\_j)})$, which is obtained by encrypting the verification value $q_{a\_i}^{(a\_j)}$, using a common key between an $a_j$-th one of the authentication servers and the authentication server, for $j=1, \ldots, m$. At the authentication server's verification value decrypting step, the authentication server decrypts the ciphertext $\text{Enc}_{S\_a\_iS\_a\_j}(q_{a\_j}^{(a\_i)})$ received from the $a_j$-th authentication server to obtain the verification value $q_{a\_j}^{(a\_i)}$, using the common key between the $a_j$-th authentication server and the authentication server, for $j=1, \ldots, m$. At the authentication server's verifying step, the authentication server verifies whether a sum total of the verification values $q_{a\_1}^{(W)}, \ldots, q_{a\_m}^{(W)}$ is equal to 0 or not.

A multi-party secure authentication method of a second aspect of this invention comprises a password dispersing step, a dispersed password value encrypting step, a dispersed password value transferring step, a first dispersed password value decrypting step, a second dispersed password value decrypting step, a first authentication server's verification value generating step, a second authentication server's verification value generating step, a first authentication server's verification value encrypting step, a second authentication server's verification value encrypting step, a first authentication server's verification value decrypting step, a second authentication server's verification value decrypting step, a first authentication server's verifying step, and a second authentication server's verifying step.

It is assumed below that: $n \geq 3$ is satisfied; $2k-1 \leq n$ is satisfied; $k \leq m$ is satisfied; $m \leq n$ is satisfied; $a_1, \ldots, a_m$ are $m$ different integers each of which is equal to or larger than 1 and equal to or smaller than $n$, where $a_m = n$ is satisfied; $(k, n)$ secret sharing is secret sharing in which reconstruction is possible if there are $k$ or more dispersed values among $n$ dispersed values; $[r^{(i)}]_1, \ldots, [r^{(i)}]_n$ ($i=1, \ldots, n$) are such dispersed values by the $(k, n)$ secret sharing that a random number $r^{(i)}$ is obtained when $[r^{(i)}]_1, \ldots, [r^{(i)}]_n$ are reconstructed; and $[0^{(a\_i)}]_1, \ldots, [0^{(a\_i)}]_n$ ($i=1, \ldots, m$) are such dispersed values by the $(k, n)$ secret sharing that 0 is obtained when $[0^{(a\_i)}]_1, \ldots, [0^{(a\_i)}]_n$ are reconstructed; $\lambda_{a\_i}^{(j)}(i \in 1, \ldots, m)$ indicates a constant satisfying the following formula:

[Formula 7]
$$r^{(j)} w = \sum_{i=1}^{m} \lambda_{a_i}^{(j)} [r^{(j)}]_{a_i} [w]_{a_i}$$

and $\hat{\lambda}_{a\_i}^{(j)}(i \in 1, \ldots, m)$ indicates a constant satisfying the following formula:

[Formula 8]
$$0 = \sum_{i=1}^{m} \hat{\lambda}_{a_i}^{(j)} [0^{(j)}]_{a_i}$$

At the password dispersing step, a user apparatus disperses an inputted password w' into n dispersed values $[w']_1, \ldots, [w']_n$. At the dispersed password value encrypting step, the user apparatus obtains a ciphertext $\text{Enc}_{US\_i}([w']_i)$, which is obtained by encrypting a dispersed value $[w']_i$, using a common key between the user apparatus and an i-th authentication server, and obtains a ciphertext $\text{Enc}_{US\_n}([w']_n)$, which is obtained by encrypting a dispersed value $[w']_n$, using a common key between the user apparatus and an intermediate authentication server, for $i=1, \ldots, n-1$. At the dispersed password value transferring step, an intermediate authentication server transmits the ciphertext $\text{Enc}_{US\_i}([w']_i)$ received from the user apparatus to the i-th authentication server, for $i=1, \ldots, n-1$. At the first dispersed password value decrypting step, the authentication server decrypts the ciphertext $\text{Enc}_{US\_i}([w']_i)$ received from the intermediate authentication server to obtain the dispersed value $[w']_i$, using a common key between the user apparatus and the authentication server. At the second dispersed password value decrypting step, the intermediate authentication server decrypts the ciphertext $\text{Enc}_{US\_n}([w']_n)$ to obtain the dispersed value $[w']_i$, using a common key between the user apparatus and the intermediate authentication server. At the first authentication server's verification value generating step, the authentication server determines a verification value $q_{a\_i}^{(a\_j)}$, for $j=1, \ldots, m$, by the following formula:

$$q_{a_i}^{(aj)} = \lambda_{a_i}^{(aj)} [r^{(aj)}]_{a_i} ([w]_{a_i} - [w']_{a_i}) + \hat{\lambda}_{a_i}^{(aj)} [0^{(aj)}]_{a_i} \quad \text{[Formula 9]}$$

At the second authentication server's verification value generating step, the intermediate authentication server determines a verification value $q_{a\_m}^{(a\_j)}$, for $j=1, \ldots, m$, by the following formula:

$$q_{a_m}^{(aj)} = \lambda_{a_m}^{(aj)} [r^{(aj)}]_{a_m} ([w]_{a_m} - [w']_{a_m}) + \hat{\lambda}_{a_m}^{(aj)} [0^{(aj)}]_{a_m} \quad \text{[Formula 10]}$$

At the first authentication server's verification value encrypting step, the authentication server obtains a ciphertext $\text{Enc}_{S\_a\_iS\_a\_j}(q_{a\_i}^{(a\_j)})$, which is obtained by encrypting the verification value $q_{a\_i}^{(a\_j)}$, using a common key between an $a_j$-th one of the authentication servers or the intermediate authentication server, and the authentication server, for $j=1, \ldots, m$. At the second authentication server's verification value encrypting step, the intermediate authentication server obtains a ciphertext $\text{Enc}_{S\_a\_mS\_a\_j}(q_{a\_m}^{(a\_j)})$, which is obtained by encrypting the verification value $q_{a\_m}^{(a\_j)}$, using a common key between the $a_j$-th authentication server and the intermediate authentication server, for $j=1, \ldots, m-1$. At the first authentication server's verification value decrypting step, the authentication server decrypts a ciphertext $Enc_{S\_a\_iS\_a\_j}(q_{a\_j}^{(a\_i)})$ received from the $a_j$-th authentication server to obtain the verification value $q_{a\_j}^{(a\_i)}$, using the common key between the $a_j$-th authentication server or the intermediate authentication server, and the authentication server, for $j=1, \ldots, m$. At the second authentication server's verification value decrypting step, the intermediate authentication server decrypts the ciphertext $Enc_{S\_a\_mS\_a\_j}(q_{a\_j}^{(a\_m)})$ received from the $a_j$-th authentication server to obtain the verification value $q_{a\_j}^{(a\_m)}$, using the common key between the $a_j$-th authentication server and the intermediate authentication server, for $j=1, \ldots, m$. At the first authentication server's verifying step, the authentication server verifies whether a sum total of the verification values $q_{a\_1}^{(a\_i)}, \ldots, q_{a\_m}^{(a\_i)}$ is equal to 0 or not. At the second authentication server's verifying step, the intermediate authentication server verifies whether a sum total of the verification values $q_{a\_1}^{(a\_m)}, \ldots, q_{a\_m}^{(a\_m)}$ is equal to 0 or not.

Effects of the Invention

According to this invention, even when an intermediate server exists, a plurality of servers can simultaneously authenticate a user securely.

DETAILED DESCRIPTION OF THE EMBODIMENTS

Figure 1:
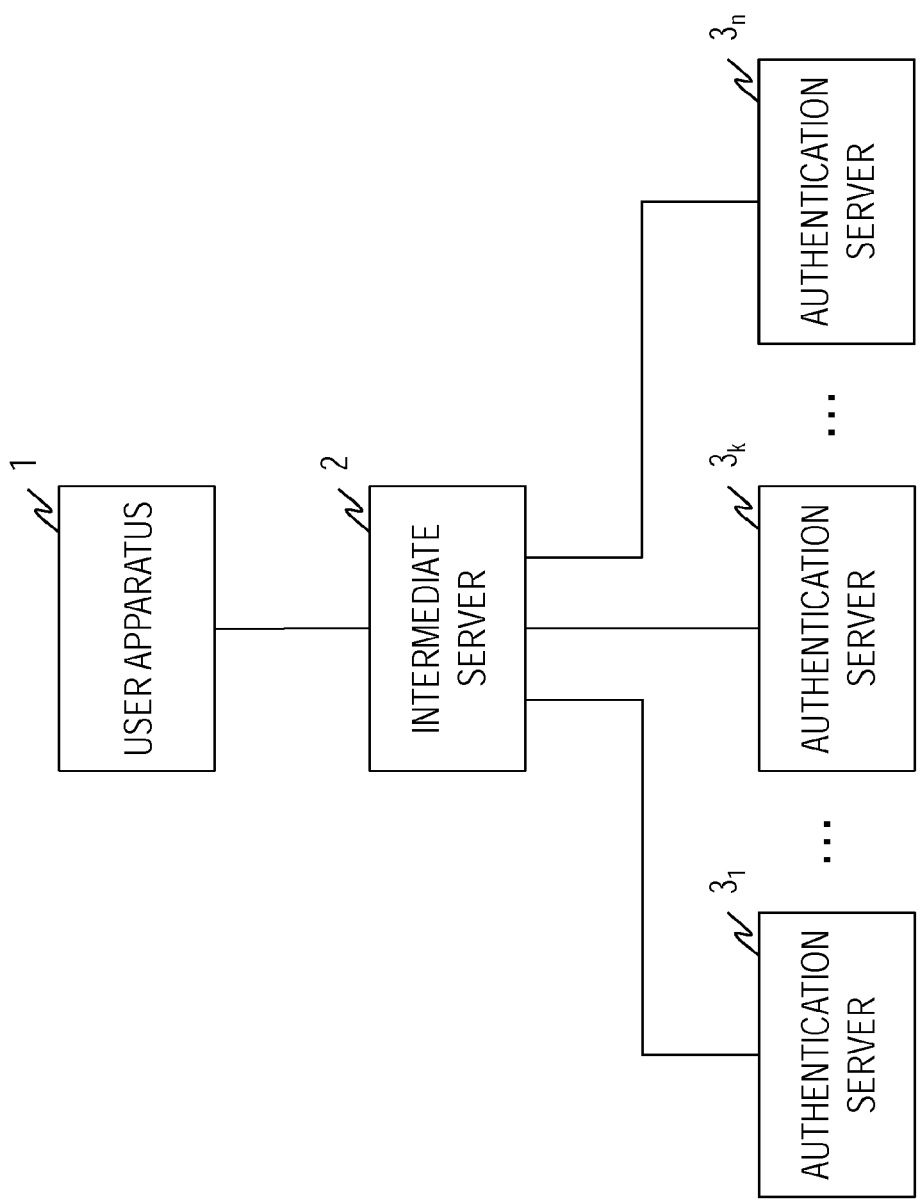
FIG. 1 is a diagram illustrating a functional configuration of a multi-party secure authentication system according to a first embodiment.

Embodiments of the present invention will be described in detail below. In the drawings, the same reference numerals will be given to components having the same function, and repeated description will be omitted.

[Way of Notation]

Prior to description of the embodiments, the way of notation and terms used in this specification will be defined.

The symbol _ (underscore) indicates a subscript. For example, $x^{y\_z}$ indicates that $y_z$ is a superscript of x, and $x_{y\_z}$ indicates that $y_z$ is a subscript of x.

The symbol ˆ (caret) indicates that a circumflex is attached to a character immediately after the caret. For example, ˆλ indicates the following character in a formula.

$$\hat{\lambda}$$ [Formula 11]

The symbol → (superscript arrow) indicates a vector.

The symbol [ ] (square brackets) indicates dispersed values of data shown in the square brackets. For example, [w] indicates a dispersed value of w.

The symbol $Enc_{AB}(X)$ indicates a ciphertext obtained by encrypting data X by a common key between a node A and a node B.

[Basic Way of Thinking]

A basic way of thinking about the multi-party secure authentication technique of this invention will be described.

Dramatis personae appearing through the whole technique are a user apparatus 1, an intermediate server 2 and n authentication servers $3_1, \ldots, 3_n$, where n is an integer equal to or larger than 3.

First, it is registered with the group of the authentication servers $3_1, \ldots, 3_n$ that a password of the user apparatus 1 which uses a system is w. The user also generates some random numbers to be used together with the password at the time of performing authentication, and transmits the random numbers to the authentication servers $3_1, \ldots, 3_n$, respectively. At this time, dispersed values and the like to be transmitted are encrypted with a common key between the user apparatus 1 and each of the authentication servers $3_1, \ldots, 3_n$ so that the intermediate server 2 which intervenes misuses the information to impersonate the user apparatus 1. Further, as for the password itself, only dispersed values of the password are stored into the authentication servers $3_1, \ldots, 3_n$, respectively, using secret sharing. Therefore, each of the authentication servers $3_1, \ldots, 3_n$ does not know the password itself.

Next, a procedure for performing authentication will be described. When the user apparatus 1 attempts authentication with a password w', it is derived by cooperative computation that difference between w and w' is 0 in order to confirm that the registered password w of the user apparatus 1 and the inputted password w' correspond to each other. In order to prevent too much authority of authentication from being given to any of participants constituting the system (specifically, the intermediate server 2 and the authentication servers $3_1, \ldots, 3_n$), each of the participants performs calculation for the authentication. In order to prevent the registered password w and the inputted password w' from being known to each participant by the cooperative computation, the cooperative computation is performed in combination with random numbers. Further, in order not to reuse the random numbers used here for the next authentication, the random numbers are updated at the end of the authentication procedure.

Moreover, an improved method will be described in which, in order to cope with a replay attack performed by misusing ciphertexts exchanged via the intermediate server 2 in the authentication procedure, random numbers are generated by the authentication servers $3_1, \ldots, 3_n$ in advance and shared with the user apparatus 1 to disable reuse of a ciphertext of a password transmitted at the time of authentication. The replay attack is such an attack that, by reusing ciphertexts for which authentication is successful, the intermediate server 2 personates the user apparatus 1 and causes authentication to be successful.

[Secret Sharing Technique]

In this invention, a secret sharing technique is used as a constituent feature. In the secret sharing technique used in this invention, such (k, n) secret sharing that 2k−1<n is satisfied is used. The (k, n) secret sharing is a technique in which, when certain data is divided into n pieces, nothing is known about the original data even if up to k−1 pieces are collected, but the original data can be reconstructed if k or more pieces are collected.

Specifically, the secret sharing technique is configured with a Share algorithm and a Reconst algorithm described below.

The Share algorithm is an algorithm for dividing data. The divided pieces of data are called shares or dispersed values. With a secret s as an input, the Share algorithm divides the secret s into n pieces and output the n pieces. The procedures are written like the following formula:

[Formula 12]

$$([s]_1, \ldots, [s]_n) \leftarrow \text{Share}(s) \quad (1)$$

The Reconst algorithm is an algorithm for reconstructing data. With m (k≤m≤n) shares as an input, the Reconst algorithm outputs an original secret s. In the secret sharing technique used in this invention, it is assumed that $\lambda_{a_i}$ (i=1, ..., m) determined from m and $\{a_1, \ldots, a_m\}$ exists, and the following formula is satisfied, wherein $a_1, \ldots, a_m$ are m different integers each of which is equal to or larger than 1 and equal to or smaller than n.

[Formula 13]

$$s = \Sigma_{i=1}^{m} \lambda_{a_i} [s]_{a_i} \quad (2)$$

[FIRST EMBODIMENT]

An example of a functional configuration of a multi-party secure authentication system according to a first embodiment will be described with reference to FIG. 1. The multi-party secure authentication system comprises a user apparatus 1, an intermediate server 2 and n authentication servers $3_1, \ldots, 3_n$.

Figure 2:
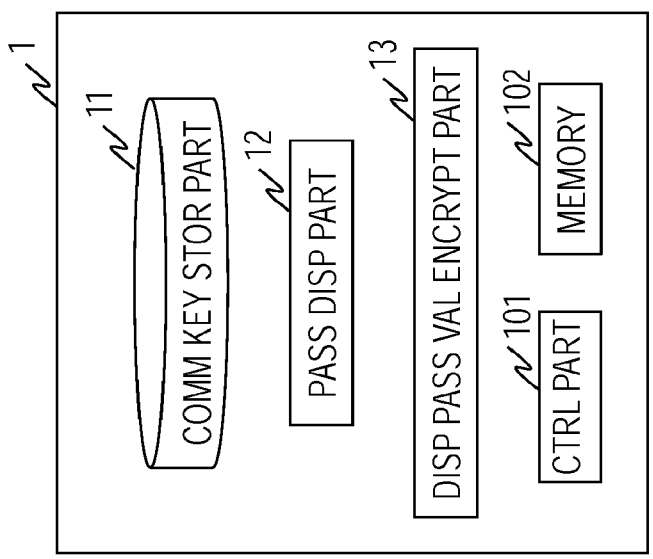
FIG. 2 is a diagram illustrating a functional configuration of a user apparatus according to the first embodiment.

An example of a functional configuration of the user apparatus 1 will be described with reference to FIG. 2. The user apparatus 1 comprises a controlling part 101, a memory 102, a common key storing part 11, a password dispersing part 12, and a dispersed password value encrypting part 13. The user apparatus 1 is a special apparatus configured by reading a special program into a well-known or dedicated computer having, for example, a CPU (central processing unit), a RAM (random access memory) and the like. For example, the user apparatus 1 executes each process under the control of the controlling part 101. Data inputted to the user apparatus 1 or data obtained by each process is stored into, for example, the memory 102, and the data stored in the memory 102 is read out as necessary and used for other processes. Each storing part the user apparatus 1 is provided with can be configured, for example, a main memory such as a RAM (Random Access Memory), an auxiliary memory configured with a hard disk, an optical disk or a semiconductor memory device like a flash memory, or middleware such as a relational database and a key-value store.

Figure 3:
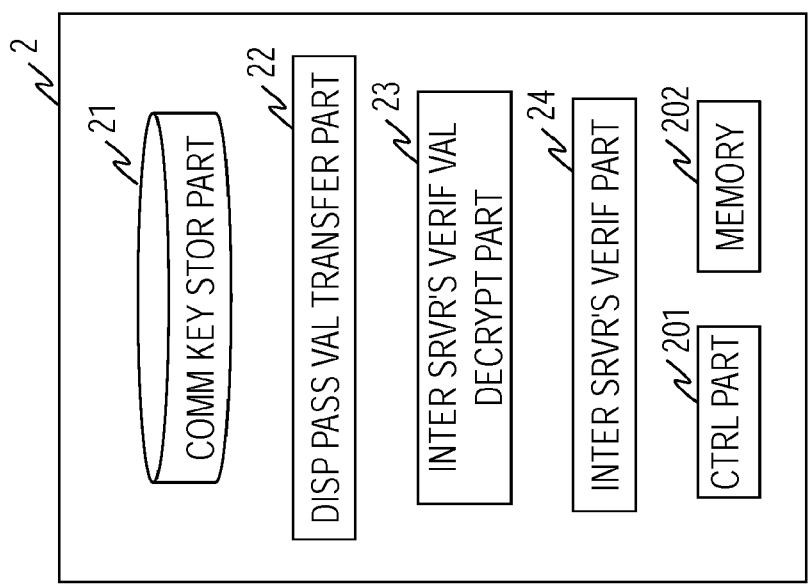
FIG. 3 is a diagram illustrating a functional configuration of an intermediate server according to the first embodiment.

An example of a functional configuration of the intermediate server 2 will be described with reference to FIG. 3. The intermediate server 2 comprises a controlling part 201, a memory 202, a common key storing part 21, a dispersed password value transferring part 22, an intermediate server's verification value decrypting part 23, and an intermediate server's verifying part 24. The intermediate server 2 is a special apparatus configured by reading a special program into a well-known or dedicated computer having, for example, a CPU (central processing unit), a RAM (random access memory) as a main memory, and the like. For example, the intermediate server 2 executes each process under the control of the controlling part 201. Data inputted to the user apparatus 1 or data obtained by each process is stored into, for example, the memory 102, and the data stored in the memory 202 is read out as necessary and used for other processes. Each storing part the intermediate server 2 is provided with can be configured, for example, a main memory such as a RAM (Random Access Memory), an auxiliary memory configured with a hard disk, an optical disk or a semiconductor memory device like a flash memory, or middleware such as a relational database and a key-value store.

Figure 4:
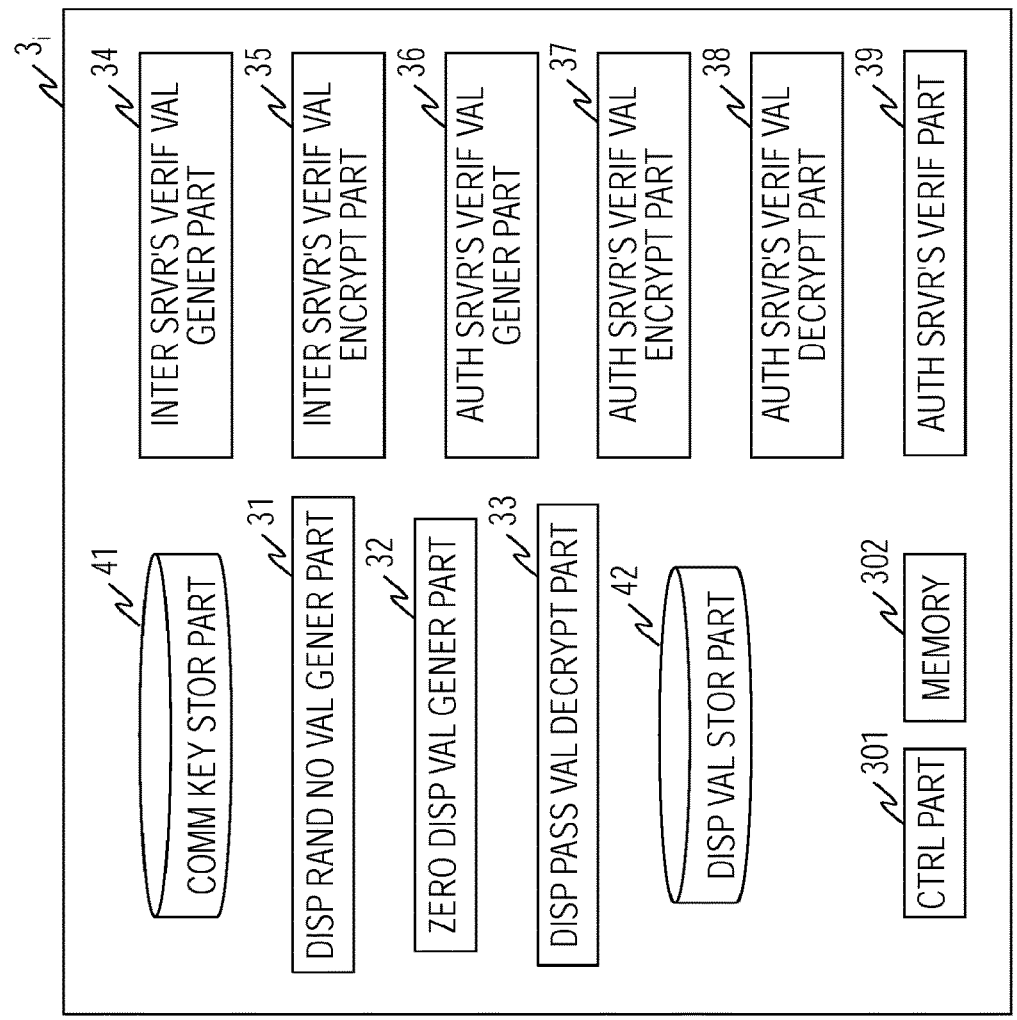
FIG. 4 is a diagram illustrating a functional configuration of an authentication server according to the first embodiment.

An example of a functional configuration of the authentication server 3 will be described with reference to FIG. 4. The authentication server 3 comprises a controlling part 301, a memory 302, a dispersed random-number value generating part 31, a zero dispersion value generating part 32, a dispersed password value decrypting part 33, an intermediate server's verification value generating part 34, an intermediate server's verification value encrypting part 35, an authentication server's verification value generating part 36, an authentication server's verification value encrypting part 37, an authentication server's verification value decrypting part 38, an authentication server's verifying part 39, a common key storing part 41, and a dispersed value storing part 42. The authentication server 3 is a special apparatus configured by reading a special program into a well-known or dedicated computer having, for example, a CPU (central processing unit), a RAM (random access memory) and the like. For example, the authentication server 3 executes each process under the control of the controlling part 301. Data inputted to the authentication server 3 or data obtained by each process is stored into, for example, the memory 302, and the data stored in the memory 302 is read out as necessary and used for other processes. Each storing part the authentication server 3 is provided with can be configured, for example, a main memory such as a RAM (Random Access Memory), an auxiliary memory configured with a hard disk, an optical disk or a semiconductor memory device like a flash memory, or middleware such as a relational database and a key-value store. The storing parts the authentication server 3 is provided with are required only to be logically divided and may be stored in one physical storage device.

An example of a process flow for a multi-party secure authentication method will be described according to order of the procedure performed actually, with reference to FIGS. 5 to 10.

In the common key storing part 11 of the user apparatus 1, a common key between the user apparatus 1 and each apparatus with which the user apparatus 1 performs encrypted communication is stored. Specifically, a total of n common keys, which are common keys between the user apparatus 1 and the authentication servers $3_1, \ldots, 3_n$, are stored.

In the common key storing part 21 of the intermediate server 2, a common key between the intermediate server 2 and each apparatus with which the intermediate server 2 performs encrypted communication is stored. Specifically, a total of n common keys, which are common keys between the intermediate server 2 and the authentication servers $3_1, \ldots, 3_n$, are stored.

In the common key storing part 41 of the i-th authentication server $3_i$, a common key between the authentication server $3_i$ and each apparatus with which the authentication server $3_i$ performs encrypted communication is stored. Specifically, a total of n+1 common keys, which are common keys between the authentication server $3_i$ and the user apparatus 1, the intermediate server 2 and the other n-1 authentication servers $3_j$ (j=1, . . . , n; j≠i) are stored in the common key storing part 41 of one authentication server 3.

A common key encryption system used in this invention may be any existing common encryption method. The common key encryption system can be selected in consideration of security and processing speed required by an information system to which this invention is applied. The common key stored in each apparatus is a common key generated in accordance with the selected common key encryption system and can be shared according to a key exchange system permitted by the common key encryption system.

<<Password Registration Phase>>

Figure 5:
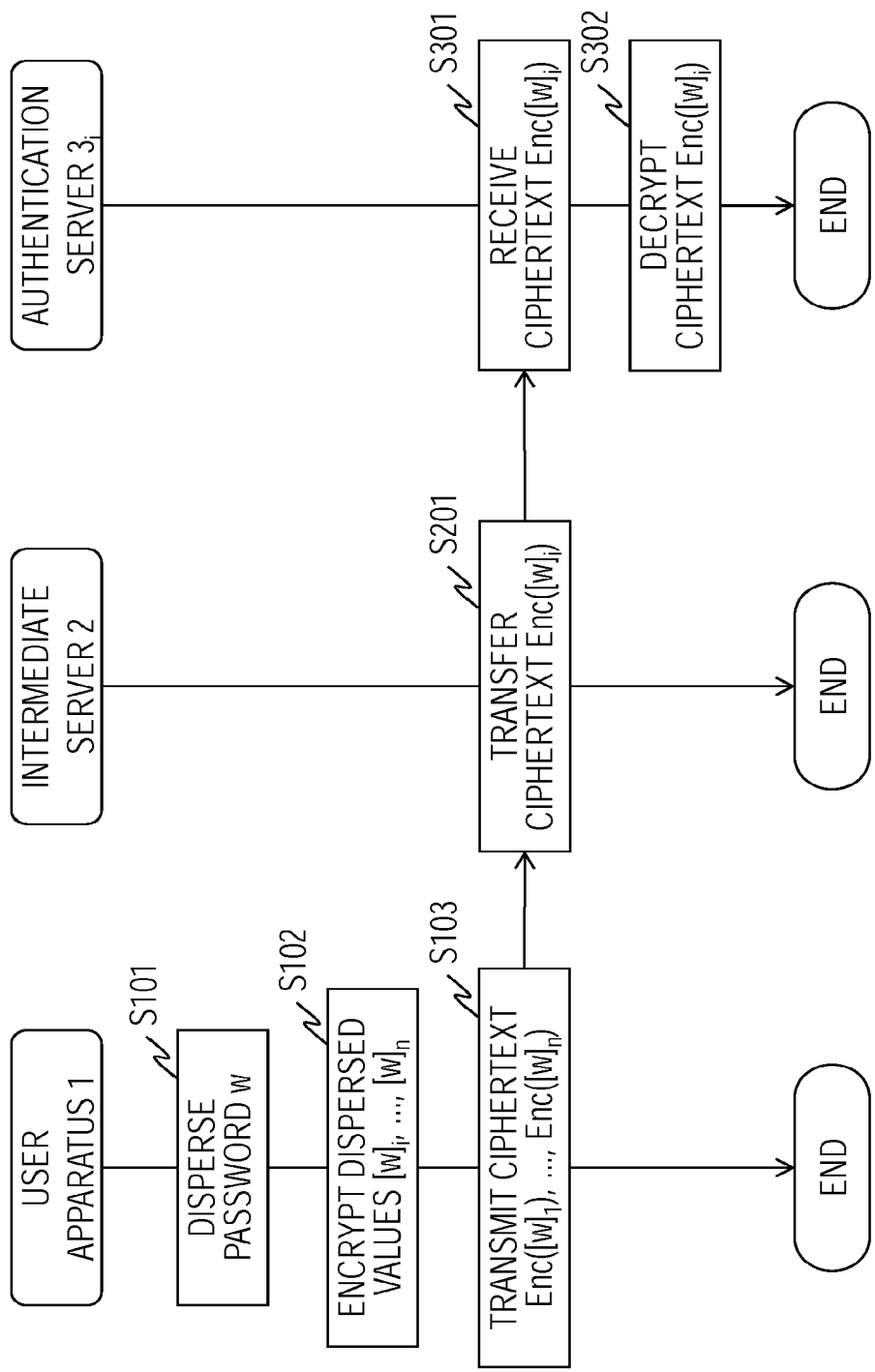
FIG. 5 is a diagram illustrating a process flow for a password registration phase of a multi-party secure authentication method according to the first embodiment.

A process of a password registration phase of the multi-party secure authentication method will be described with reference to FIG. 5. The password registration phase is executed in the case of newly registering a user or in the case of changing the password of a registered user.

At step S101, the password dispersing part 12 of the user apparatus 1 disperses a password w into n dispersed values $[w]_1, \ldots, [w]_n$. The password w is an arbitrary password inputted by a user U operating the user apparatus 1. That is, the password dispersing part 12 performs calculation of the following formula (3):

[Formula 14]

$$([w]_1, \ldots, [w]_n) \rightarrow \text{Share}(w) \quad (3)$$

At step S102, the dispersed password value encrypting part 13 of the user apparatus 1 obtains a ciphertext $\text{Enc}_{US\_i}([w]_i)$, which is an encrypted dispersed value $[w]_i$, using a common key between the user apparatus 1 and the i-th authentication server $3_i$, for i=1, . . . , n.

At step S103, the dispersed password value encrypting part 13 of the user apparatus 1 transmits the n pieces of ciphertexts $\text{Enc}_{US\_1}([w]_1), \ldots, \text{Enc}_{US\_n}([w]_n)$ obtained at step S102 to the intermediate server 2.

At step S201, the dispersed password value transferring part 22 of the intermediate server 2 receives the n pieces of the ciphertext $\text{Enc}_{US\_1}([w]_1), \ldots, \text{Enc}_{US\_n}([w]_n)$ received from the user apparatus 1, and transmits each piece of the ciphertext $\text{Enc}_{US\_i}([w]_i)$ to the authentication server $3_i$, for i=1, . . . , n.

At step S301, the dispersed password value decrypting part 33 of the authentication server $3_i$ receives the ciphertext $\text{Enc}_{US\_i}([w]_i)$ transferred from the intermediate server 2.

At step S302, the dispersed password value decrypting part 33 of the authentication server $3_i$ decrypts the ciphertext $\text{Enc}_{US\_i}([w]_i)$ received from the intermediate server 2 to obtain the dispersed value $[w]_i$, using the common key between the user apparatus 1 and the authentication server $3_i$. The dispersed value $[w]_i$ is stored into the dispersed value storing part 42.

<<Random Number Generation Phase>>

A process of a random number generation phase of the multi-party secure authentication method will be described with reference to FIG. 6. It is necessary that the random number generation phase is executed at least before a user who has registered a password performs authentication.

At step S311, the dispersed random-number value generating part 31 of the authentication server $3_i$ generates d dispersed values $[r_1]_i, \ldots, [r_d]_i$ which become random numbers $r_1, \ldots, r_d$ when reconstructed. The generated dispersed values $[r_1]_i, \ldots, [r_d]_i$ are stored into the dispersed value storing part 42. Here, d≥1 is satisfied.

At step S312, the zero dispersion value generating part 32 of the authentication server $3_i$ generates d dispersed value $[0_1]_i, \ldots, [0_d]_i$ which become 0 when reconstructed. The generated dispersed values $[0_1]_i, \ldots, [0_d]_i$ are stored into the dispersed value storing part 42.

The process from step S311 to step S312 may be executed in parallel with the process from step S101 to step S302 or executed separately in advance.

<<Authentication Phase>>

A process of an authentication phase of the multi-party secure authentication method will be described with reference to FIGS. 7 to 9. The authentication phase is executed when a user who has registered a password requests authentication. The process of the authentication phase does not have to be performed by all the n authentication servers $3_1, \ldots, 3_n$ but is required to be executed only by m authentication servers selected arbitrarily. In the following description, it is assumed that $a_1, \ldots, a_m$ are m different integers each of which is equal to or larger than 1 and equal to or smaller than n, and that m authentication servers $3_{a\_1}, \ldots, 3_{a\_m}$ perform the process of the authentication phase.

The authentication server $3_{a\_i}$ selects $[r^{(W)}]_{a\_i}$, $[r^{(1)}]_{a\_i}, \ldots, [r^{(m)}]_{a\_i}$ from dispersed values $[r_1]_{a\_i}, \ldots, [r_d]_{a\_i}$ stored in the dispersed value storing part 42. Further, similarly, the authentication server $3_{a\_i}$ selects $[0^{(W)}]_{a\_i}$, $[0^{(1)}]_{a\_i}, \ldots, [0^{(m)}]_{a\_i}$ from dispersed values $[0_1]_{a\_i}, \ldots, [0_d]_{a\_i}$ stored in the dispersed value storing part 42.

Figure 7:
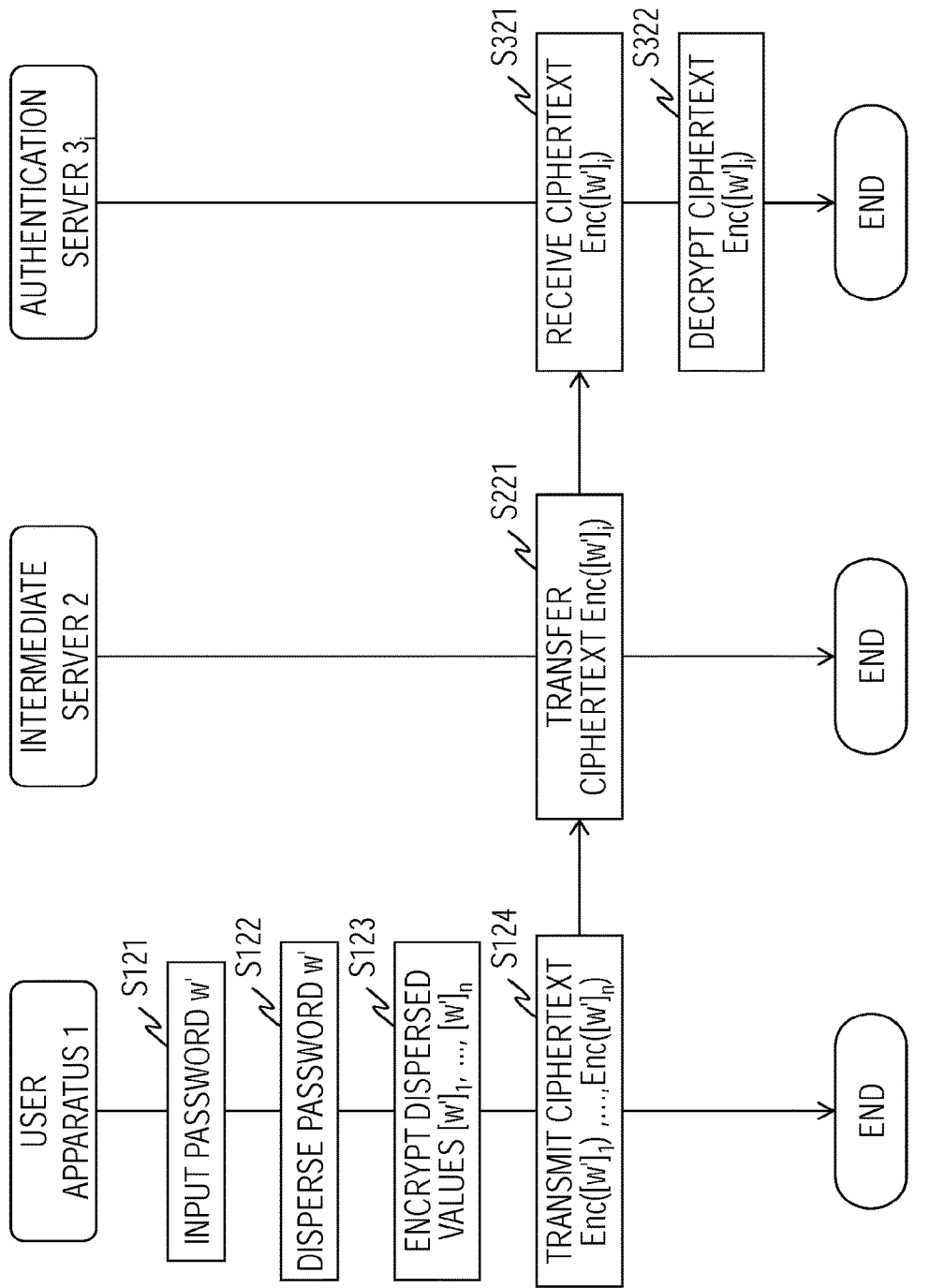
FIG. 7 is a diagram illustrating a process flow for an authentication phase of the multi-party secure authentication method according to the first embodiment.

At step S121 shown in FIG. 7, the user U who has registered the password w operates the user apparatus 1 and inputs a password w' for requesting authentication.

At step S122, the password dispersing part 12 of the user apparatus 1 disperses the password w' into n dispersed values $[w']_1, \ldots, [w']_n$. That is, the password dispersing part 12 performs the following calculation.

[Formula 15]

$$([w']_1, \ldots, [w']_n) \leftarrow \text{Share}(w') \quad (4)$$

At step S123, the dispersed password value encrypting part 13 of the user apparatus 1 obtains a ciphertext $\text{Enc}_{US\_a\_i}([w']_{a\_i})$, which is obtained by encrypting a dispersed value $[w']_{a\_i}$ with the use of a common key between the user apparatus 1 and the $a_i$-th authentication server $3_{a\_i}$, for $i=1, \ldots, m$.

At step S124, the dispersed password value encrypting part 13 of the user apparatus 1 transmits the n pieces of ciphertexts $\text{Enc}_{US\_1}([w']_1), \ldots, \text{Enc}_{US\_n}([w']_n)$ obtained at step S123 to the intermediate server 2.

At step S221, the dispersed password value transferring part 22 of the intermediate server 2 receives the n pieces of ciphertexts $\text{Enc}_{US\_1}([w']_1), \ldots, \text{Enc}_{US\_n}([w']_n)$ received from the user apparatus 1, and transmits the ciphertext $\text{Enc}_{US\_a\_i}([w']_{a\_i})$ to the authentication server $3_{a\_i}$, for $i=1, \ldots, m$.

At step S321, the dispersed password value decrypting part 33 of the authentication server $3_{a\_i}$ receives the ciphertext $\text{Enc}_{US\_a\_i}([w']_{a\_i})$ transferred from the intermediate server 2.

At step S322, the dispersed password value decrypting part 33 of the authentication server $3_{a\_i}$ decrypts the ciphertext $\text{Enc}_{US\_a\_i}([w']_{a\_i})$ received from the intermediate server 2 to obtain the dispersed value $[w']_{a\_i}$, using the common key between the user apparatus 1 and the authentication server $3_{a\_i}$.

Figure 8:
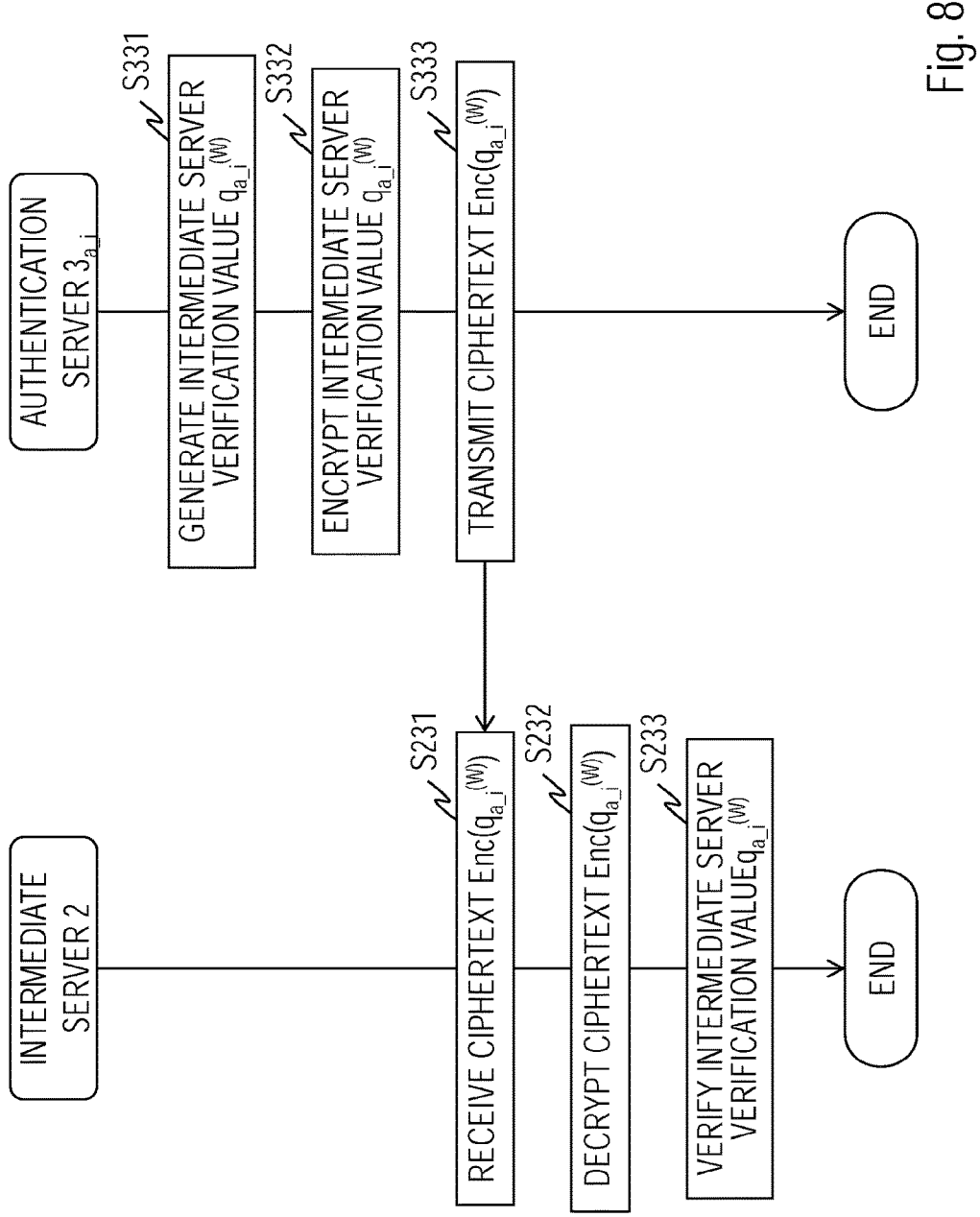
FIG. 8 is a diagram illustrating the process flow for the authentication phase of the multi-party secure authentication method according to the first embodiment.

At step S331 shown in FIG. 8, the intermediate server's verification value generating part 34 of the authentication server $3_{a\_i}$ determines a verification value $q_{a\_i}^{(W)}$ by the following formula (5) using the dispersed values $[w]_{a\_i}$, $[r^{(W)}]_{a\_i}$, $[0^{(W)}]_{a\_i}$ stored in the dispersed value storing part 42 and the dispersed value $[w']_{a\_i}$ outputted by the dispersed password value decrypting part 33.

[Formula 16]

$$q_{a_i}^{(W)} = \lambda_{a_i}^{(W)} [r^{(W)}]_{a_i} ([w]_{a_i} - [w']_{a_i}) + \hat{\lambda}_{a_i}^{(W)} [0^{(W)}]_{a_i} \quad (5)$$

Here, $\lambda_{a\_i}^{(W)}$ is a known constant satisfying the formula (6), and $\hat{\lambda}_{a\_i}^{(W)}$ is a constant satisfying the formula (7).

[Formula 17]

$$r^{(W)} w = \sum_{i=1}^{m} \lambda_{a_i}^{(W)} [r^{(W)}]_{a_i} [w]_{a_i} \quad (6)$$

$$0 = \sum_{i=1}^{m} \hat{\lambda}_{a_i}^{(W)} [0^{(W)}]_{a_i} \quad (7)$$

At step S332, the intermediate server's verification value encrypting part 35 of the authentication server $3_{a\_i}$ obtains a ciphertext $\text{Enc}_{WS\_a\_i}(q_{a\_i}^{(W)})$, which is obtained by encrypting the verification value $q_{a\_i}^{(W)}$, using a common key between the intermediate server 2 and the authentication server $3_{a\_i}$.

At step S333, the intermediate server's verification value encrypting part 35 of the authentication server $3_{a\_i}$ transmits the ciphertext $\text{Enc}_{WS\_a\_i}(q_{a\_i}^{(W)})$ obtained at step S332 to the intermediate server 2.

At step S231, the intermediate server's verification value decrypting part 23 of the intermediate server 2 receives m pieces of ciphertexts $\text{Enc}_{WS\_a\_1}(q_{a\_1}^{(W)}), \ldots, \text{Enc}_{WS\_a\_m}(q_{a\_m}^{(W)})$ received from the m authentication servers $3_{a\_1}, \ldots, 3_{a\_m}$.

At step S232, the intermediate server's verification value decrypting part 23 of the intermediate server 2 decrypts the ciphertext $\text{Enc}_{WS\_a\_i}(q_{a\_i}^{(W)})$ to obtain a verification value $q_{a\_i}^{(W)}$, using a common key between the intermediate server 2 and the $a_i$-th authentication $3_{a\_i}$, for $i=1, \ldots, m$. The intermediate server's verification value decrypting part 23 outputs the m dispersed values $q_{a\_1}^{(W)}, \ldots, q_{a\_m}^{(W)}$ to the intermediate server's verifying part 24.

At step S233, the intermediate server's verifying part 24 of the intermediate server 2 verifies whether a sum total of the verification values $q_{a\_1}^{(W)}, \ldots, q_{a\_m}^{(W)}$ is equal to 0 or not. Specifically, the intermediate server's verifying part 24 confirms whether the equation of the formula (8) is satisfied or not.

[Formula 18]

$$0 = \sum_{i=1}^{m} q_{a_i}^{(W)} \quad (8)$$

If the formula (8) is satisfied, the intermediate server's verifying part 24 notifies the user apparatus 1 that authentication is successful. If the formula (8) is not satisfied, the intermediate server's verifying part 24 notifies the user apparatus 1 that authentication is failed.

Figure 9:
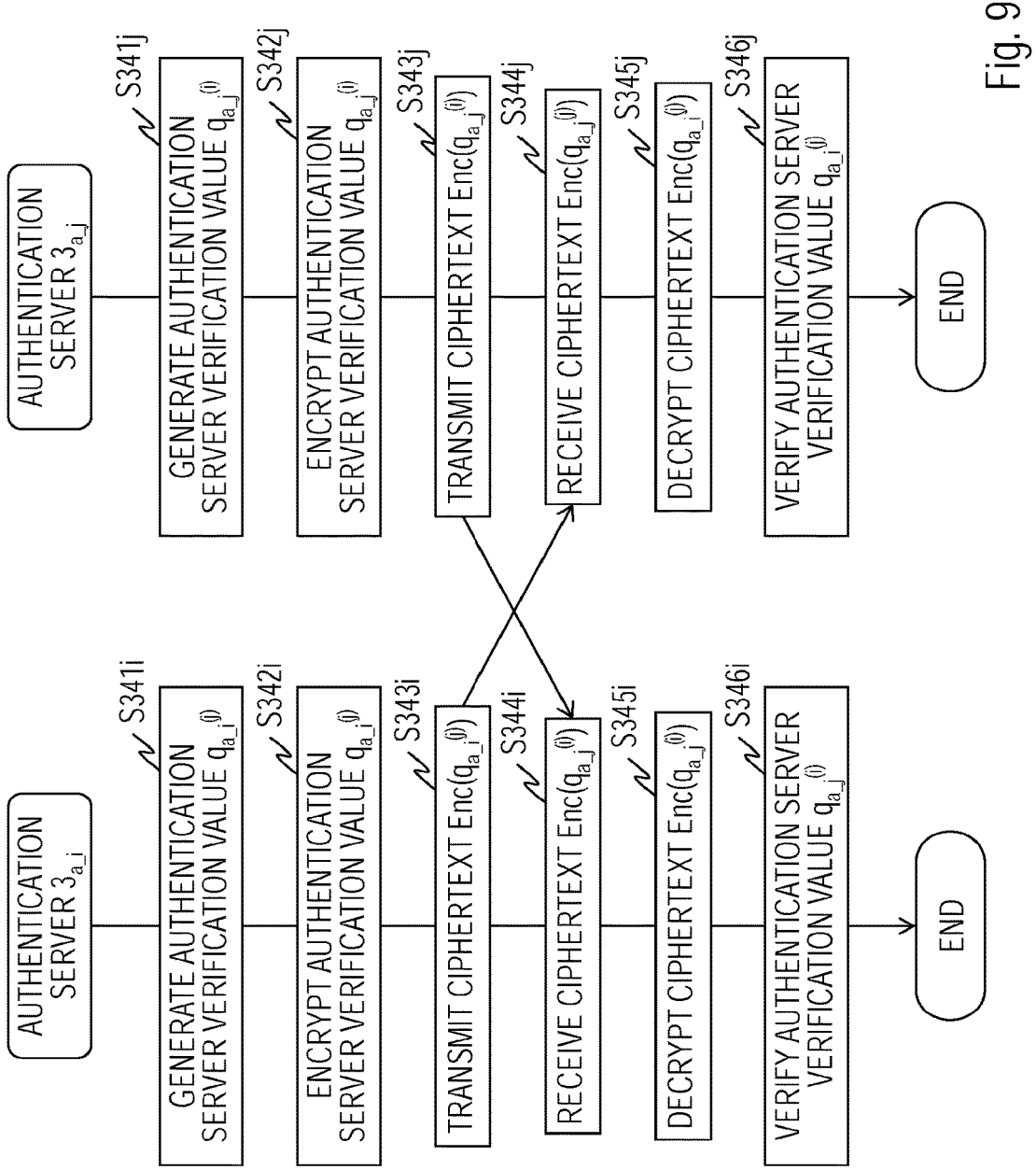
FIG. 9 is a diagram illustrating the process flow for the authentication phase of the multi-party secure authentication method according to the first embodiment.

At step S341i shown in FIG. 9, the authentication server's verification value generating part 36 of the authentication server $3_{a\_i}$ determines a verification value $q_{a\_i}^{(a\_j)}$ by the following formula (9) using dispersed values $[w]_{a\_i}$, $[r^{(a\_j)}]_{a\_i}$, $[0^{(a\_j)}]_{a\_i}$ stored in the dispersed value storing part 42 and the dispersed value $[w']_{a\_i}$ outputted by the dispersed password value decrypting part 33, for $j=1, \ldots, m$.

[Formula 19]

$$q_{a_i}^{(a_j)} = \lambda_{a_i}^{(j)} [r^{(a_j)}]_{a_i} ([w]_{a_i} - [w']_{a_i}) + \hat{\lambda}_{a_i}^{(j)} [0^{(a_j)}]_{a_i} \quad (9)$$

Here, $\lambda_{a\_i}^{(j)}$ is a known constant satisfying the formula (10), and $\hat{\lambda}_{a\_i}^{(j)}$ is a constant satisfying the formula (11).

[Formula 20]

$$r^{(j)} w = \sum_{i=1}^{m} \lambda_{a_i}^{(j)} [r^{(j)}]_{a_i} [w]_{a_i} \quad (10)$$

$$0 = \sum_{i=1}^{m} \hat{\lambda}_{a_i}^{(j)} [0^{(j)}]_{a_i} \quad (11)$$

At step S342i, the authentication server's verification value encrypting part 37 of the authentication server $3_{a\_i}$ obtains a ciphertext $Enc_{S\_a\_iS\_a\_j}(q_{a\_i}^{(a\_j)})$, which is obtained by encrypting the verification value $q_{a\_i}^{(a\_j)}$, using a common key between the $a_j$-th authentication server $3_{a\_j}$ and the $a_i$-th authentication server $3_{a\_i}$, for $j=1, \ldots, m(j \neq i)$. As a result, the authentication server's verification value encrypting part 37 obtains m−1 pieces of ciphertexts $Enc_{S\_a\_iS\_a\_1}(q_{a\_i}^{(a\_1)}), \ldots, Enc_{S\_a\_iS\_a\_m}(q_{a\_i}^{(a\_m)})$ (excluding $Enc_{S\_a\_iS\_a\_i}(q_{a\_i}^{(a\_i)})$).

At step S343i, the authentication server's verification value encrypting part 37 of the authentication server $3_{a\_i}$ transmits the m−1 pieces of ciphertexts $Enc_{S\_a\_iS\_a\_1}(q_{a\_i}^{(a\_1)}), \ldots, Enc_{S\_a\_iS\_a\_m}(q_{a\_i}^{(a\_m)})$ obtained at step S342i (excluding $Enc_{S\_a\_iS\_a\_i}(q_{a\_i}^{(a\_i)})$) to the authentication server $3_{a\_j}$, respectively, for $j=1, \ldots, m(j \neq i)$.

At step S344i, the authentication server's verification value decrypting part 38 of the authentication server $3_{a\_i}$ receives m−1 pieces of ciphertexts $Enc_{S\_a\_iS\_a\_i}(q_{a\_1}^{(a\_i)}), \ldots, Enc_{S\_a\_mS\_a\_i}(q_{a\_m}^{(a\_i)})$ (excluding $Enc_{S\_a\_iS\_a\_i}(q_{a\_i}^{(a\_i)})$) from m−1 authentication servers $3_{a\_j}$ ($j=1, \ldots, m(j \neq i)$).

At step S345i, the authentication server's verification value decrypting part 38 of the authentication server $3_{a\_i}$ decrypts the ciphertext $Enc_{S\_a\_jS\_a\_i}(q_{a\_j}^{(a\_i)})$ to obtain the verification value $q_{a\_i}^{(a\_j)}$, using the common key between the $a_j$-th authentication server $3_{a\_j}$ and the $a_i$-th authentication server $3_{a\_i}$, for $j=1, \ldots, m(j \neq i)$. The authentication server's verification value decrypting part 38 outputs the m verification values $q_{a\_1}^{(a\_i)}, \ldots, q_{a\_m}^{(a\_i)}$ to the authentication server's verifying part 39 together with a verification value $q_{a\_i}^{(a\_i)}$ generated by the authentication server's verification value generating part at step S341i.

At step S345i, the authentication server's verifying part 39 of the authentication server $3_{a\_i}$ verifies whether a sum total of the verification values $q_{a\_1}^{(a\_i)}, \ldots, q_{a\_m}^{(a\_i)}$ is equal to 0 or not. Specifically, the authentication server's verifying part 39 confirms whether the equation of the formula (12) is satisfied or not.

[Formula 21]

$$0 = \sum_{i=1}^{m} q_{a_j}^{(a_i)} \qquad (12)$$

If the formula (12) is satisfied, the authentication server's verifying part 39 notifies the user apparatus 1 that authentication is successful. If the formula (12) is not satisfied, the authentication server's verifying part 39 notifies the user apparatus 1 that authentication is failed.

<<Random Number Update Phase>>

Each time the process of the authentication phase is executed once, a process of a random number update phase is executed. The random number update phase is a process for updating random numbers so that the random numbers are not reused at the next authentication. In the random number update phase, if there are unused random numbers among random numbers generated by the process of the random number generation phase performed previously, the random numbers are set to be used in the next process of the authentication phase. If there are not any unused random numbers, new random numbers are generated similarly to the content of the process of the random number generation phase. The process of the random number update phase may be executed in parallel with the process of the authentication phase. That is, it is confirmed whether a sufficient number of unused random numbers remain at the time of using random numbers on the authentication phase, and new random numbers can be generated if there are not a sufficient number of unused random numbers.

[SECOND EMBODIMENT]

An intermediate server such as a Web server, which exists between a user apparatus that a user uses and each authentication server, can know ciphertext exchanged between the user apparatus and the authentication server in addition to whether authentication is successful or not. There is a danger that the intermediate server can misuse ciphertexts of dispersed values of a password and random numbers used in the authentication procedure when authentication is successful, impersonate the user and cause authentication to be successful. A multi-party secure authentication system of a second embodiment is an improved system for preventing a replay attack by an intermediate server misusing transmitted ciphertexts.

In the following description, points different from the first embodiment will be mainly described. As for parts similar to the first embodiment, description thereof will be omitted.

Figure 10:
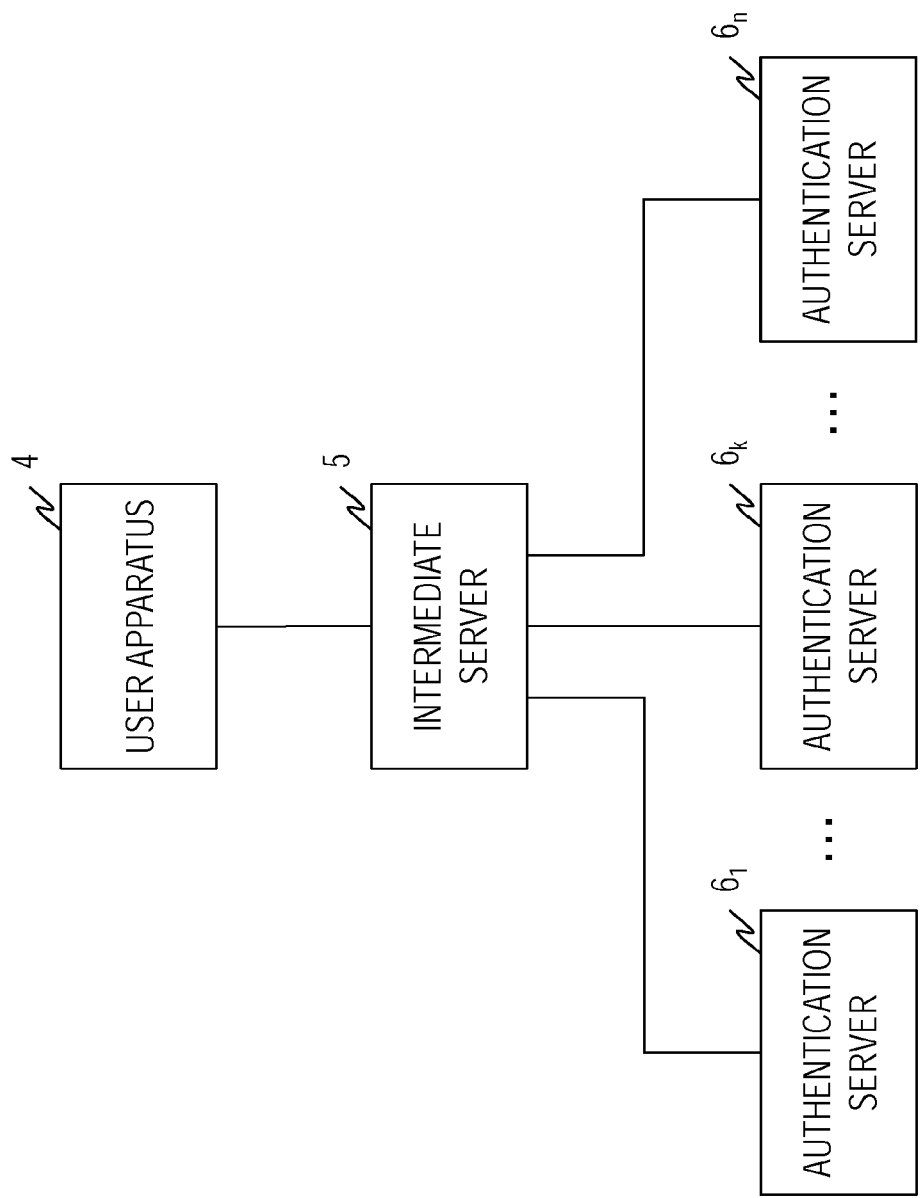
FIG. 10 is a diagram illustrating a functional configuration of a multi-party secure authentication system according to a second embodiment.

An example of a functional configuration of the multi-party secure authentication system according to the second embodiment will be described with reference to FIG. 10. The multi-party secure authentication system comprises a user apparatus 4, an intermediate server 5 and n authentication servers $6_1, \ldots, 6_n$.

Figure 11:
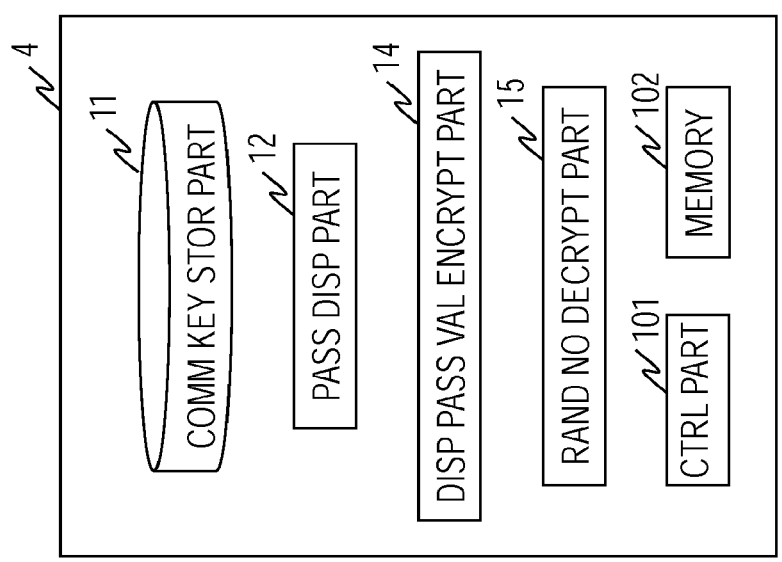
FIG. 11 is a diagram illustrating a functional configuration of a user apparatus according to the second embodiment.

An example of a functional configuration of the user apparatus 4 will be described with reference to FIG. 11. Similarly to the user apparatus 1 according to the first embodiment, the user apparatus 4 comprises the controlling part 101, the memory 102, the common key storing part 11 and the password dispersing part 12. The user apparatus 4 according to the second embodiment further comprises a dispersed password value encrypting part 14 and a random number decrypting part 15. The dispersed password value encrypting part 14 performs a process different from the process of the dispersed password value encrypting part 13 according to the first embodiment.

Figure 12:
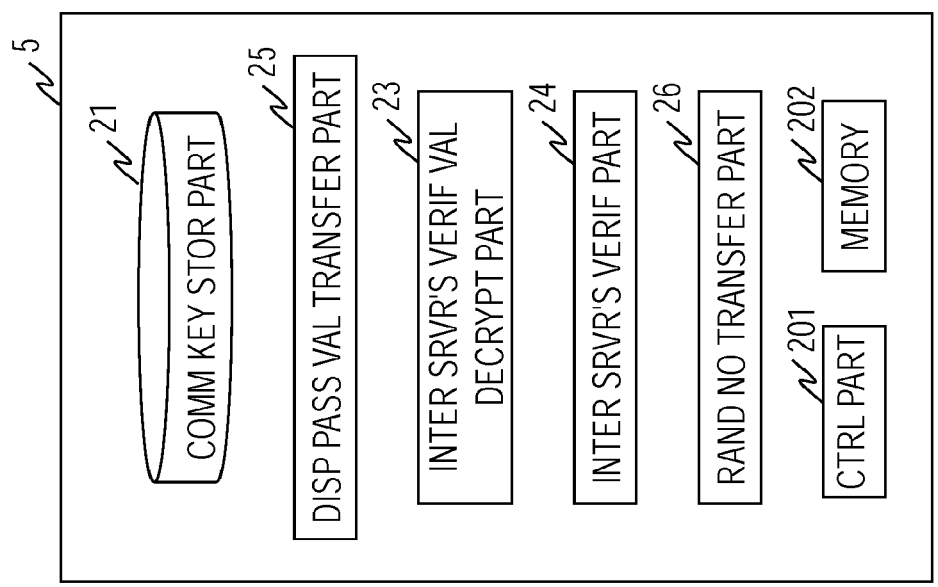
FIG. 12 is a diagram illustrating a functional configuration of an intermediate server according to the second embodiment.

An example of a functional configuration of the intermediate server 5 will be described with reference to FIG. 12. Similarly to the intermediate server 2 according to the first embodiment, the intermediate server 5 comprises the controlling part 201, the memory 202, the common key storing part 21, the intermediate server's verification value decrypting part 23, and the intermediate server's verifying part 24. The intermediate server 5 according to the second embodiment further comprises a dispersed password value transferring part 25 and a random number transferring part 26. The dispersed password value transferring part 25 performs a process different from the process of the dispersed password value transferring part 22 according to the first embodiment.

Figure 13:
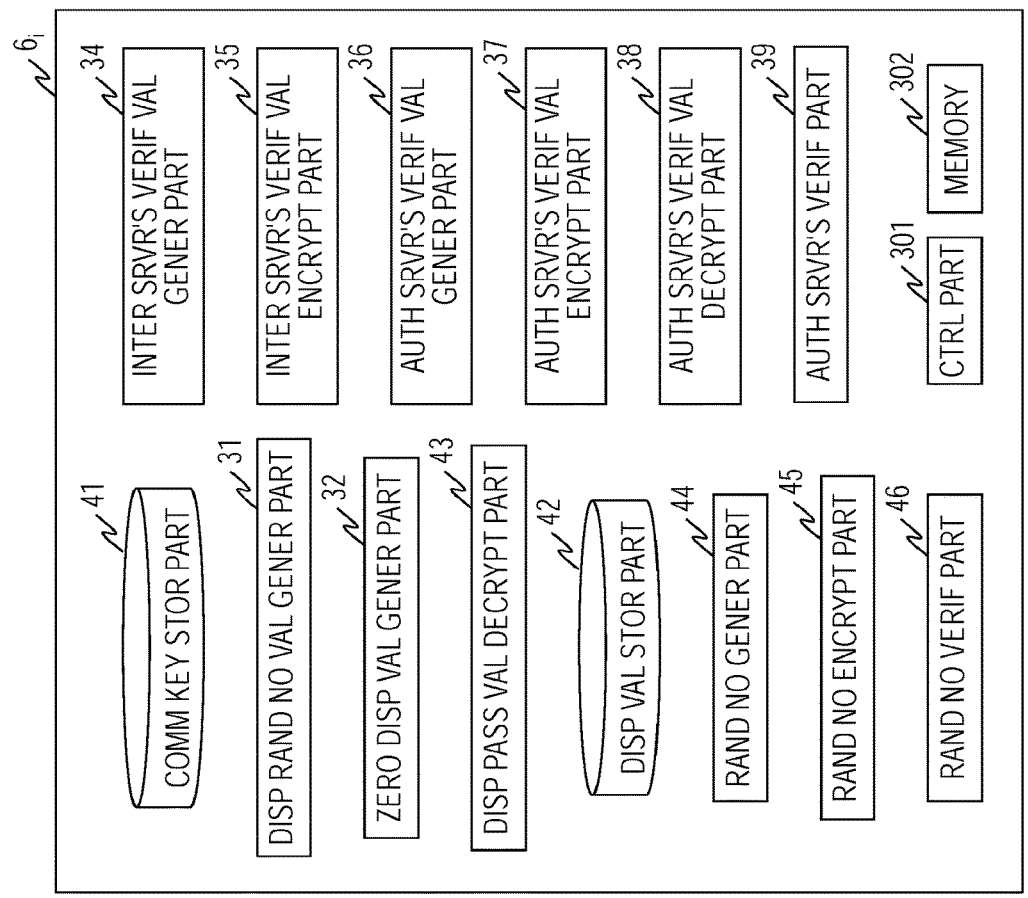
FIG. 13 is a diagram illustrating a functional configuration of an authentication server according to the second embodiment.

An example of a functional configuration of the authentication server 6 will be described with reference to FIG. 13. Similarly to the authentication server 6 according to the first embodiment, the authentication server 6 comprises the controlling part 301, the memory 302, the dispersed random-number value generating part 31, the zero dispersion value generating part 32, the intermediate server's verification value generating part 34, the intermediate server's verification value encrypting part 35, the authentication server's verification value generating part 36, the authentication server's verification value encrypting part 37, the authentication server's verification value decrypting part 38, the authentication server's verifying part 39, the common key storing part 41, and the dispersed value storing part 42. The authentication server 6 according to the second embodiment further comprises a dispersed password value decrypting part 43, a random number generating part 44, a random number encrypting part 45 and a random number verifying part 46. The dispersed password value decrypting part 43 performs a process different from the process of the dispersed password value decrypting part 33 according to the first embodiment.

Figure 14:
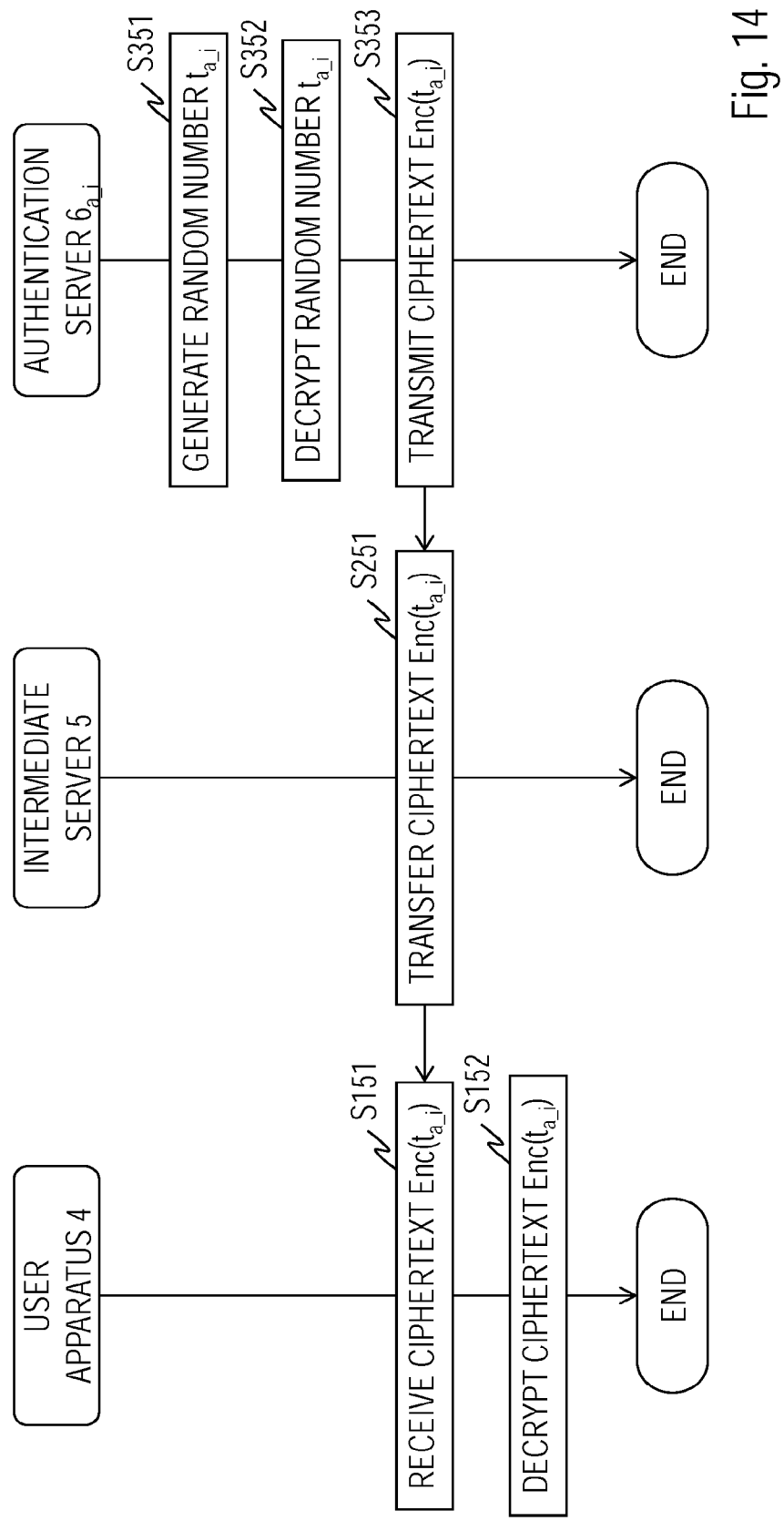
FIG. 14 is a diagram illustrating a process flow for a random number generation phase of a multi-party secure authentication method according to the second embodiment.
Figure 15:
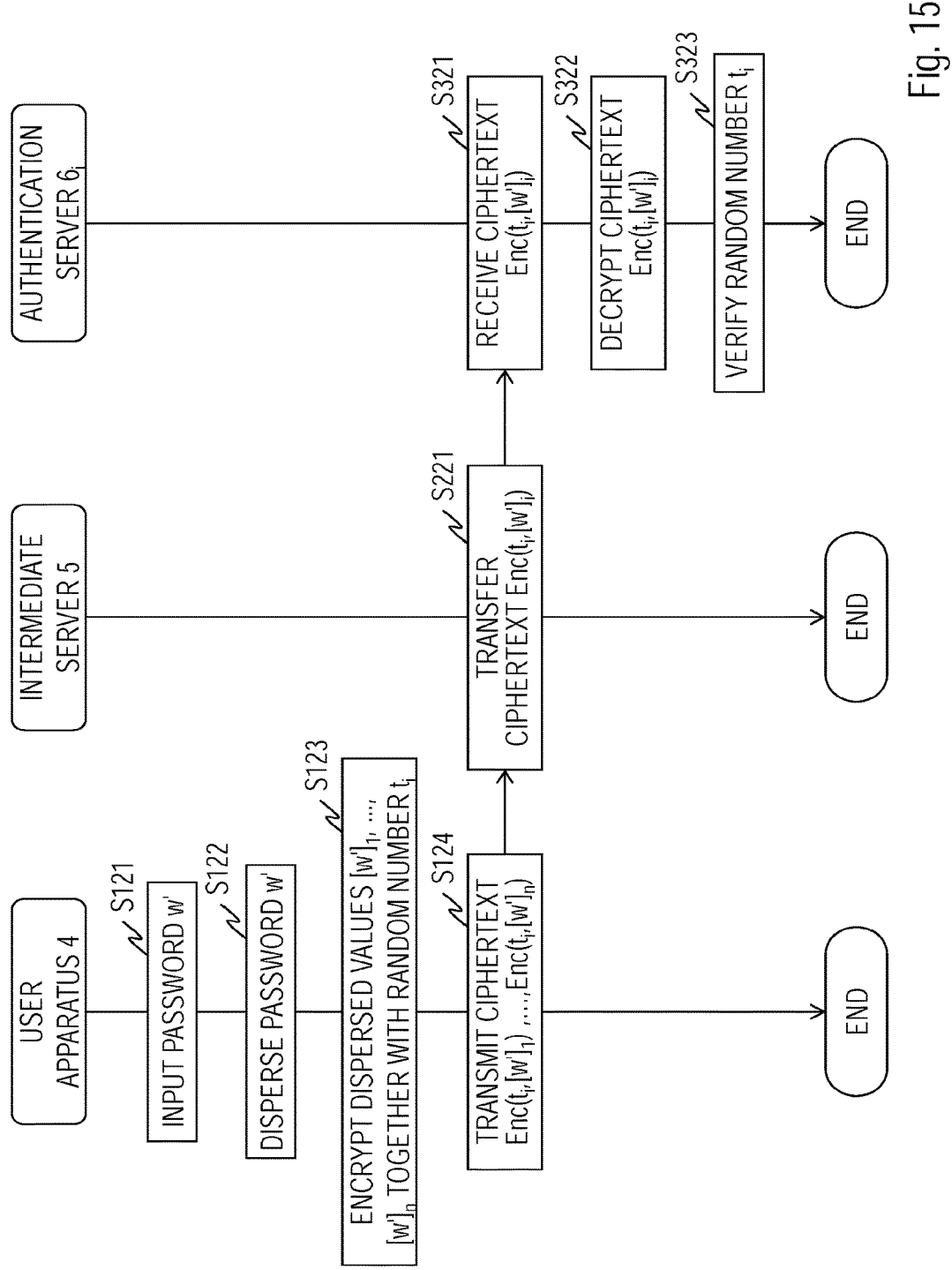
FIG. 15 is a diagram illustrating a process flow for an authentication phase of the multi-party secure authentication method according to the second embodiment.

An example of a process flow for a multi-party secure authentication method according to the second embodiment will be described according to order of the procedure performed actually, with reference to FIGS. 14 and 15.

A procedure for generating random numbers used for preventing a replay attack will be described with reference to FIG. 14. It is necessary to generate the random numbers in advance before executing the authentication phase. Since this process is a relatively light process, the process may be configured so as to be executed immediately before executing the authentication phase. This process does not have to be performed by all the n authentication servers $6_1, \ldots, 6_n$ but is required to be executed only by m authentication servers selected arbitrarily. In the following description, it is assumed that $a_1, \ldots, a_m$ are in different integers each of which is equal to or larger than 1 and equal to or smaller than n, and that m authentication servers $6_{a\_i}, \ldots, 6_{a\_m}$ perform the process.

At step S351, the random number generating part 44 of the authentication server $6_{a\_i}$ generates a random number $t_{a\_i}$.

At step S352, the random number encrypting part 45 of the authentication server $6_{a\_i}$ obtains a ciphertext $\text{Enc}_{US\_a\_i}(t_{a\_i})$, which is obtained by encrypting the random numbers $t_{a\_i}$, using a common key between the user apparatus 4 and the $a_i$-th authentication server $6_{a\_i}$.

At step S353, the random number encrypting part 45 of the authentication server $6_{a\_i}$ transmits the ciphertext $\text{Enc}_{US\_a\_i}(t_{a\_i})$ to the intermediate server 5.

At step S251, the random number transferring part 26 of the intermediate server 5 receives m pieces of ciphertexts $\text{Enc}_{US\_a\_i}(t_{a\_i})$ (i=1, . . . , m) from the m authentication server $6_{a\_i}$ (i=1, . . . , m). The received m pieces of ciphertexts $\text{Enc}_{US\_a\_i}(t_{a\_i})$ (i=1, . . . , m) are transmitted to the user apparatus 4.

At step S151, the random number decrypting part 15 of the user apparatus 6 receives the m pieces of ciphertexts $\text{Enc}_{US\_a\_i}(t_{a\_i})$ (i=1, . . . , m) from the intermediate server 5.

At step S152, the random number decrypting part 15 decrypts the ciphertext $\text{Enc}_{US\_a\_i}(t_{a\_i})$ to obtain the dispersed value $t_{a\_i}$ for i=1, . . . , m. The dispersed value $t_{a\_i}$ is stored into any storing part such as the memory 102 and the common key storing part 11.

The process of the authentication phase improved to prevent a replay attack will be described with reference to FIG. 15. Points different from the authentication phase of the first embodiment is that processes of steps S123 and S221 are different, and that a process of step S323 is added.

At step S123, the dispersed password value encrypting part 14 of the user apparatus 4 obtains a ciphertext $\text{Enc}_{US\_a\_i}(t_{a\_i}, [w']_{a\_i})$, which is obtained by encrypting the dispersed value $[w']_{a\_i}$ together with the random number $t_{a\_i}$ with the use of a common key between the user apparatus 4 and the $a_i$-th authentication server $6_{a\_i}$, for i=1, . . . , m.

At step S221, the dispersed password value transferring part 25 of the intermediate server 5 receives the m pieces of ciphertexts $\text{Enc}_{US\_a\_1}(t_{a\_i}, [w']_{a\_1}), \ldots, \text{Enc}_{US\_a\_m}(t_{a\_i}, [w']_{a\_m})$ received from the user apparatus 4, and transmits the ciphertext $\text{Enc}_{US\_a\_i}(t_{a\_i}, [w']_{a\_i})$ to the authentication server $6_{a\_i}$, for i=1, . . . , m.

At step S323, the random number verifying part 46 of the authentication server $6_{a\_i}$ confirms whether a random number $t_{a\_i}$ obtained by decrypting the ciphertext $\text{Enc}_{US\_a\_i}(t_{a\_i}, [w']_{a\_i})$ is equal to the random numbers $t_{a\_i}$ generated at step S351. If the random number $t_{a\_i}$ obtained by decryption is not equal to the random numbers $t_{a\_i}$ generated at step S351, the random number verifying part 46 notifies the user apparatus 4 that authentication is failed. Otherwise, the process at and after step S331 of the authentication phase is continued.

[THIRD EMBODIMENT]

In the multi-party secure authentication system of the first embodiment, each authentication server executes the process of the random number generation phase. In a multi-party secure authentication system of a third embodiment, a user apparatus executes the process of the random number generation phase. Though an example of applying a method of configuration of the third embodiment to the multi-party secure authentication system of the first embodiment will be described below, the method of the configuration of the third embodiment can be similarly applied to the multi-party secure authentication system of the second embodiment.

In the following description, points different from the first embodiment will be mainly described. As for parts similar to the first embodiment, description thereof will be omitted.

Figure 16:
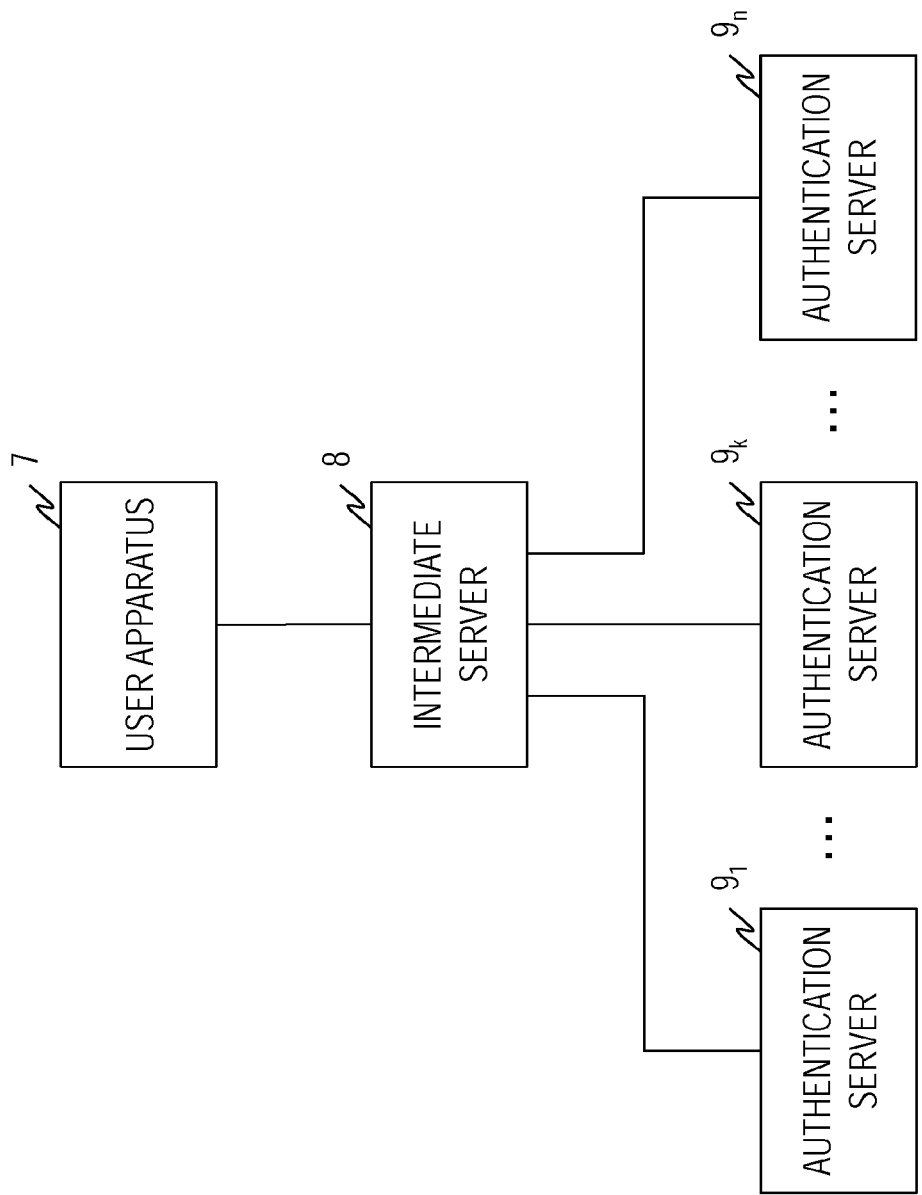
FIG. 16 is a diagram illustrating a functional configuration of a multi-party secure authentication system according to a third embodiment.

An example of a functional configuration of the multi-party secure authentication system according to the third embodiment will be described with reference to FIG. 16. The multi-party secure authentication system comprises a user apparatus 7, an intermediate server 8 and n authentication servers $9_1, \ldots, 9_n$.

Figure 17:
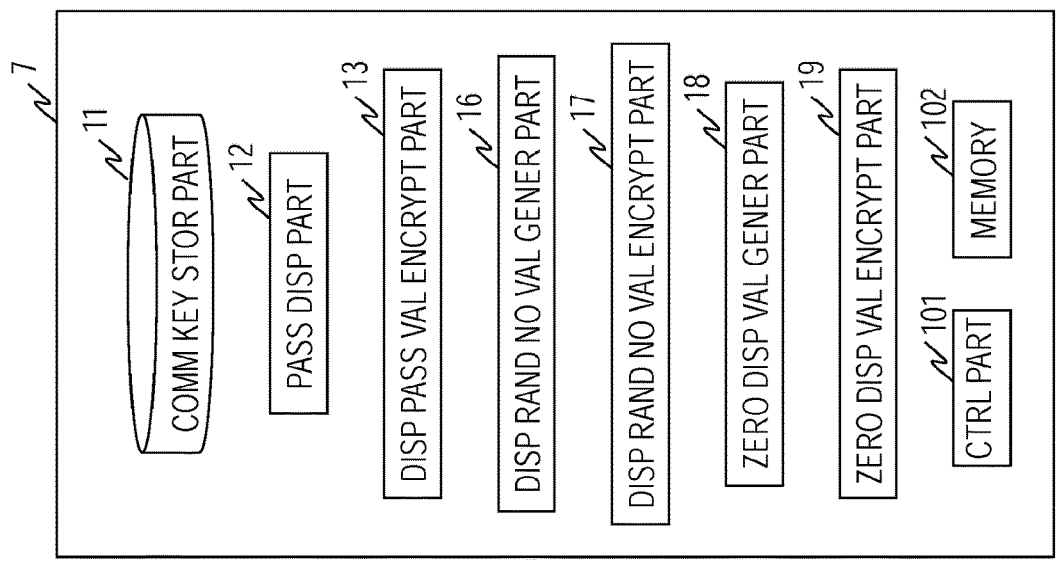
FIG. 17 is a diagram illustrating a functional configuration of a user apparatus according to the third embodiment.

An example of a functional configuration of the user apparatus 7 will be described with reference to FIG. 17. Similarly to the user apparatus 1 according to the first embodiment, the user apparatus 7 comprises the controlling part 101, the memory 102, the common key storing part 11, the password dispersing part 12 and the dispersed password value encrypting part 13. The user apparatus 7 according to the third embodiment further comprises a dispersed random-number value generating part 16, a dispersed random-number value encrypting part 17, a zero dispersion value generating part 18 and a zero dispersion value encrypting part 19.

Figure 18:
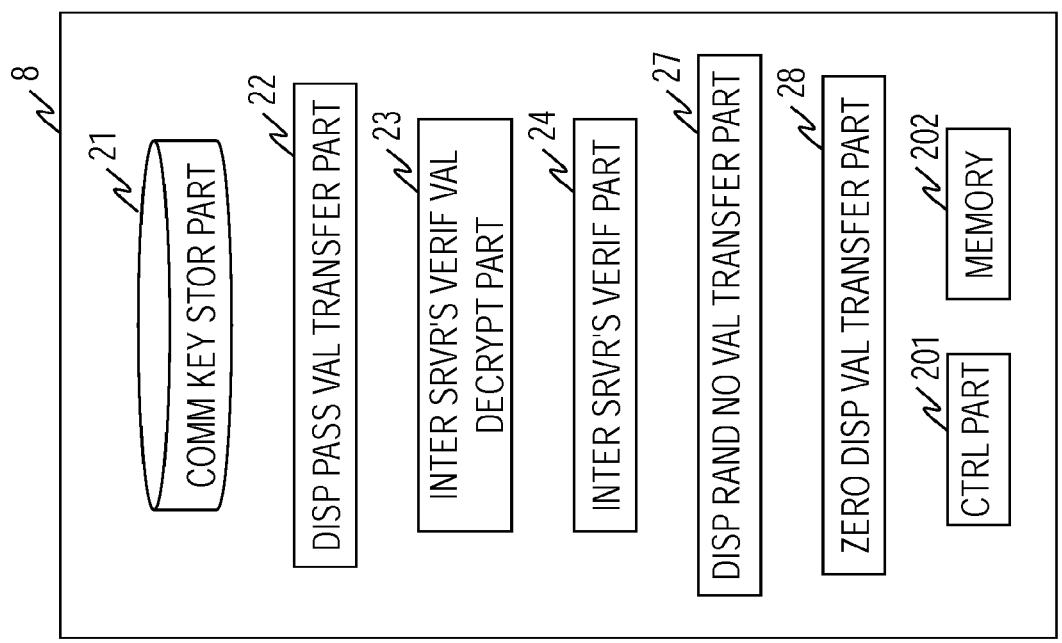
FIG. 18 is a diagram illustrating a functional configuration of an intermediate server according to the third embodiment.

An example of a functional configuration of the intermediate server 8 will be described with reference to FIG. 18. Similarly to the intermediate server 2 according to the first embodiment, the intermediate server 8 comprises the controlling part 201, the memory 202, the common key storing part 21, the dispersed password value transferring part 22, the intermediate server's verification value decrypting part 23, and the intermediate server's verifying part 24. The intermediate server 8 according to the third embodiment further comprises a dispersed random-number value transferring part 27 and a zero dispersion value transferring part 28.

Figure 19:
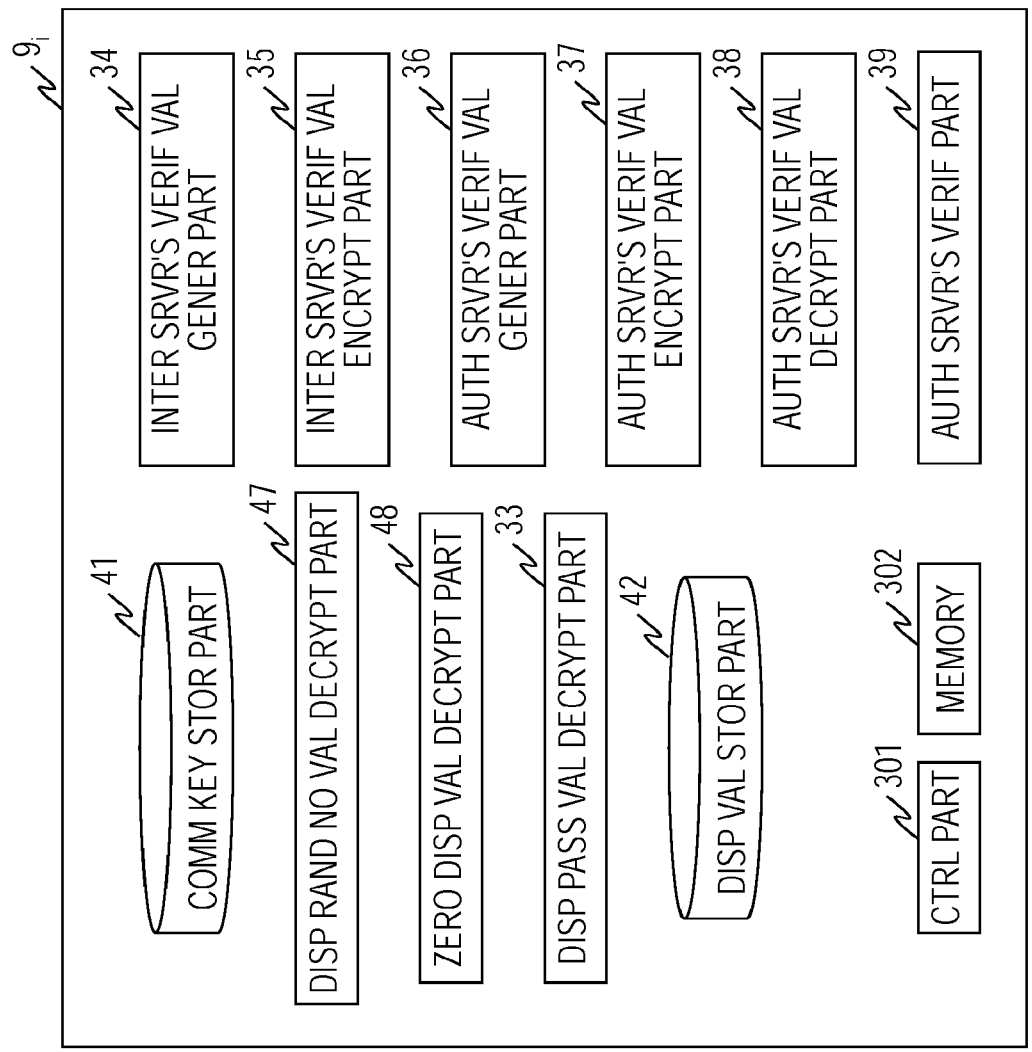
FIG. 19 is a diagram illustrating a functional configuration of an authentication server according to the third embodiment.

An example of a functional configuration of the authentication server 9 will be described with reference to FIG. 19. Similarly to the authentication server 3 according to the first embodiment, the authentication server 9 comprises the controlling part 301, the memory 302, the intermediate server's verification value generating part 34, the intermediate server's verification value encrypting part 35, the authentication server's verification value generating part 36, the authentication server's verification value encrypting part 37, the authentication server's verification value decrypting part 38, the authentication server's verifying part 39, the common key storing part 41, and the dispersed value storing part 42.

The authentication server 9 according to the third embodiment further comprises a dispersed random-number value decrypting part 47 and a zero dispersion value decrypting part 48.

An example of a process flow for a multi-party secure authentication method according to the third embodiment will be described according to order of the procedure performed actually, with reference to FIGS. 20 and 21.

<<Random Number Generation Phase>>

A process of the random number generation phase according to the third embodiment will be described with reference to FIGS. 20 and 21.

Figure 20:
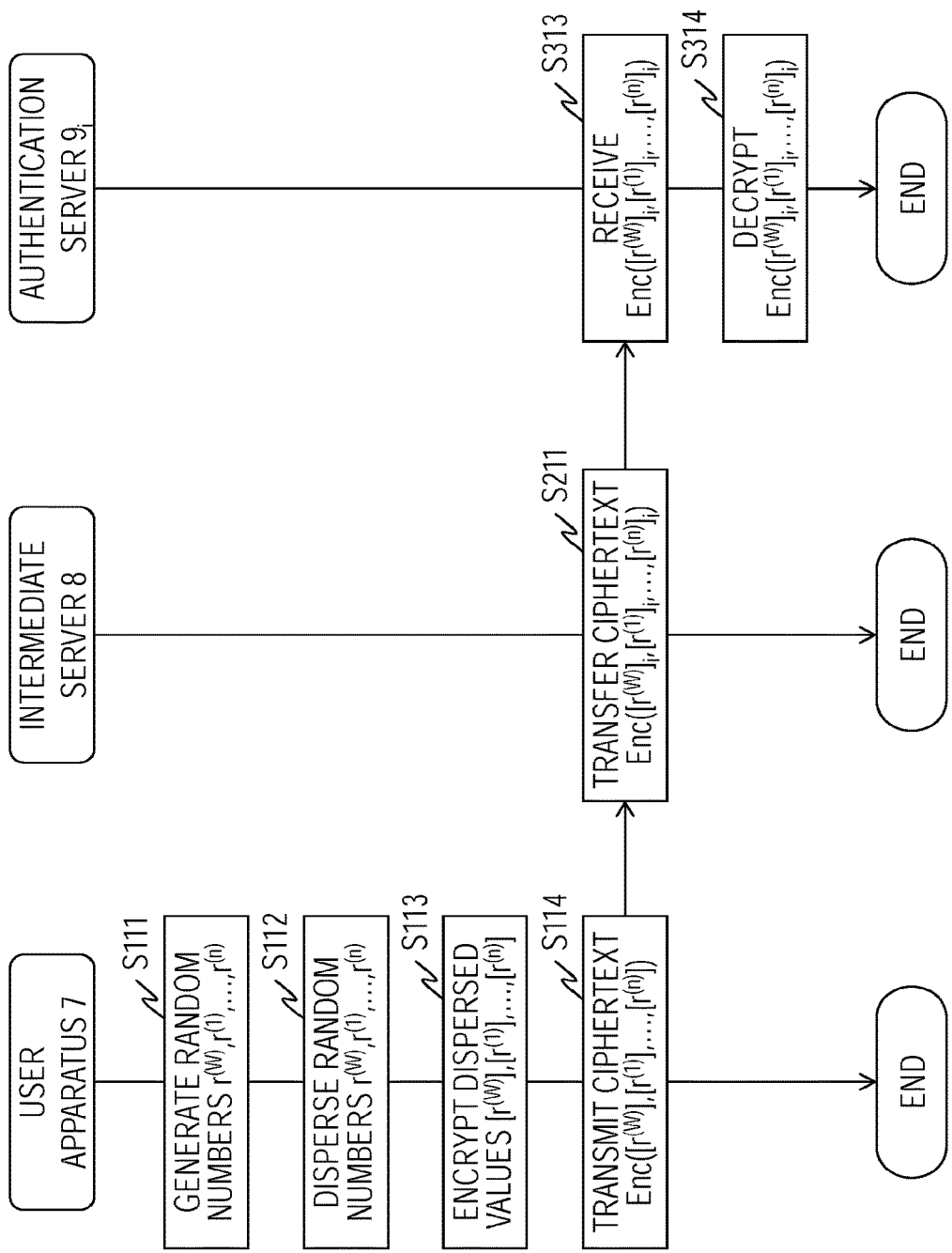
FIG. 20 is a diagram illustrating a process flow for a random number generation phase of a multi-party secure authentication method according to the third embodiment.

At step S111 shown in FIG. 20, the dispersed random-number value generating part 16 of the user apparatus 7 generates n+1 random numbers $r^{(W)}, r^{(1)}, \ldots, r^{(n)}$.

At step S112, the dispersed random-number value generating part 16 of the user apparatus 7 disperses the random numbers $r^{(W)}; r^{(1)}, \ldots, r^{(n)}$ into n dispersed values, that is, $[r^{(W)}]_1, \ldots, [r^{(W)}]_n, [r^{(1)}]_1, \ldots, [r^{(1)}]_n, \ldots, [r^{(n)}]_1, \ldots, [r^{(n)}]_n$, respectively. That is, the dispersed random-number value generating part 16 performs calculation of the following formulas (13) and (14).

[Formula 22]

$$([r^{(W)}]_1, \ldots, [r^{(W)}]_n) \leftarrow \text{Share}(r^{(W)}) \quad (13)$$

$$([r^{(i)}]_1, \ldots, [r^{(i)}]_n) \leftarrow \text{Share}(r^{(i)}) \text{ for } 1 \le i \le n \quad (14)$$

At step S113, the dispersed random-number value encrypting part 17 of the user apparatus 7 obtains a ciphertext $\text{Enc}_{US\_i}([r^{(W)}]_i, [r^{(1)}]_i, \ldots, [r^{(n)}]_i)$, which is obtained by encrypting the dispersed values $[r^{(W)}]_i, [r^{(1)}]_i, \ldots, [r^{(n)}]_i$, using a common key between the user apparatus 7 and the i-th authentication server $9_i$, for i=1, . . . , n.

At step S114, the dispersed random-number value encrypting part 17 of the user apparatus 7 transmits the n pieces of ciphertexts $\text{Enc}_{US\_1}([r^{(W)}]_1, [r^{(1)}]_1, \ldots, [r^{(n)}]_1), \ldots, \text{Enc}_{US\_n}([r^{(W)}]_n, [r^{(1)}]_n, \ldots, [r^{(n)}]_n)$ obtained at step S113 to the intermediate server 8.

At step S211, the dispersed random-number value transferring part 27 of the intermediate server 8 receives the n pieces of ciphertexts $\text{Enc}_{US\_1}([r^{(W)}]_1, [r^{(1)}]_1, \ldots, [r^{(n)}]_1), \ldots, \text{Enc}_{US\_n}([r^{(W)}]_n, [r^{(1)}]_n, \ldots, [r^{(n)}]_n)$ received from the user apparatus 7, and, for i=1, . . . , n, transmits the n pieces of ciphertexts $\text{Enc}_{US\_i}([r^{(W)}]_i, [r^{(1)}]_i, \ldots, [r^{(n)}]_i)$ to the authentication server $9_i$, respectively.

At step S313, the dispersed random-number value decrypting part 47 of the authentication server $9_i$ receives the ciphertext $\text{Enc}_{US\_i}([r^{(W)}]_i, [r^{(1)}]_i, \ldots, [r^{(n)}]_i)$ transferred from the intermediate server 8.

At step S314, the dispersed random-number value decrypting part 47 of the authentication server $9_i$ decrypts the ciphertext $\text{Enc}_{US\_i}([r^{(W)}]_i, [r^{(1)}]_i, \ldots, [r^{(n)}]_i)$ received from the intermediate server 8 to obtain n+1 dispersed values $[r^{(W)}]_i, [r^{(1)}]_i, \ldots, [r^{(n)}]_i$, using the common key between the user apparatus 7 and the authentication server $9_i$. The dispersed values $[r^{(W)}]_i, [r^{(1)}]_i, \ldots, [r^{(n)}]_i$ are stored into the dispersed value storing part 42.

Figure 21:
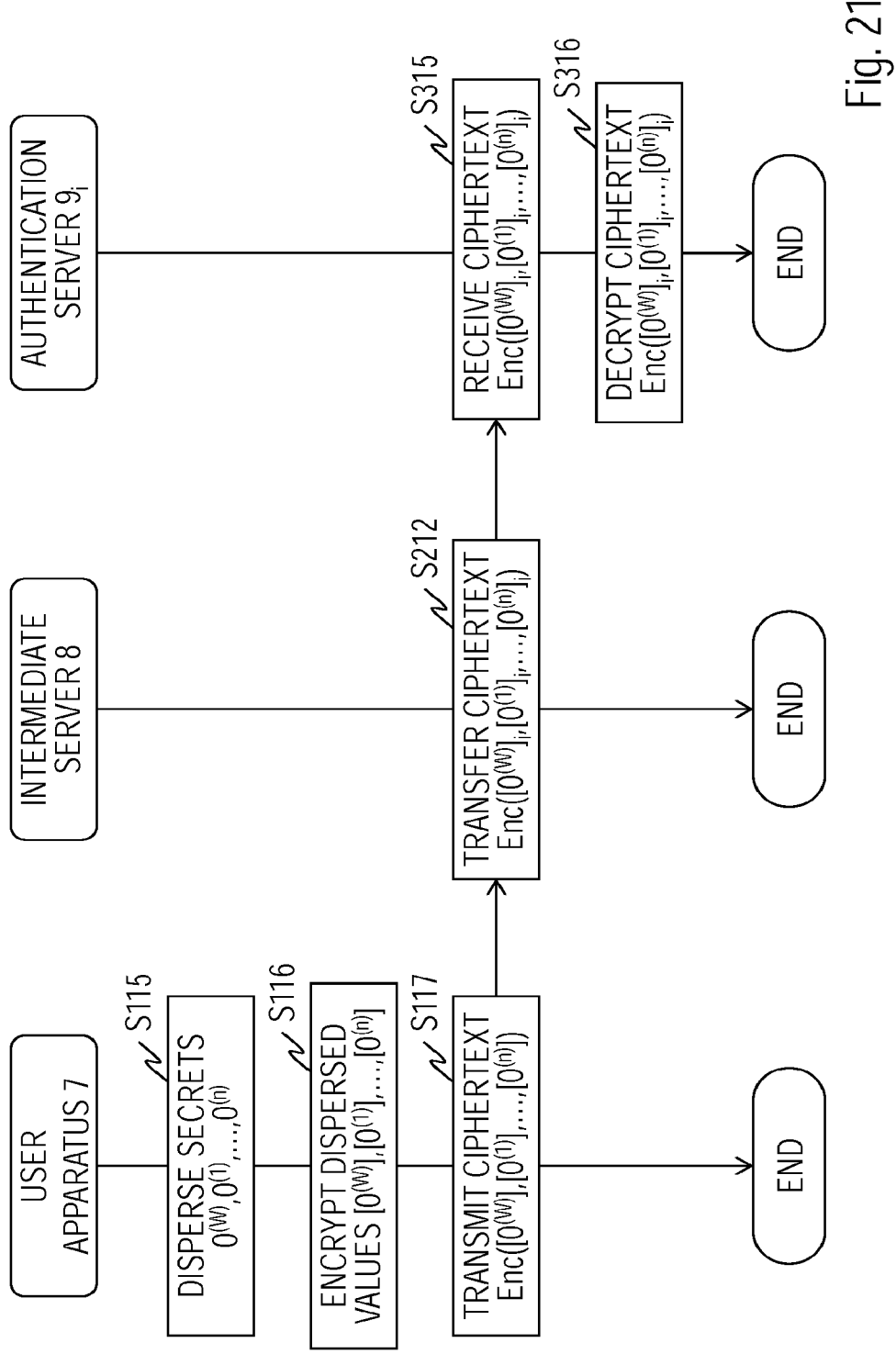
FIG. 21 is a diagram illustrating a process flow for a random number generation phase of the multi-party secure authentication method according to the third embodiment.

At step S115 shown in FIG. 21, the zero dispersion value generating part 18 of the user apparatus 7 generates m+1 sets of dispersed values $[0^{(W)}]_1, \ldots, [0^{(W)}]_n, [0^{(1)}]_1, \ldots, [0^{(1)}]_n, \ldots, [0^{(m)}]_1, \ldots, [0^{(m)}]_n$ which become zero when reconstructed.

At step S116, the zero dispersion value encrypting part 19 of the user apparatus 7 obtains a ciphertext $\text{Enc}_{US\_i}([0^{(W)}]_i, [0^{(1)}]_i, \ldots, [0^{(m)}]_i)$, which is obtained by encrypting the dispersed values $[0^{(W)}]_i, [0^{(1)}]_i, \ldots, [0^{(m)}]_i$, using a common key between the user apparatus 7 and the i-th authentication server $9_i$, for i=1, . . . , n.

At step S117, the zero dispersion value encrypting part 19 of the user apparatus 7 transmits the n pieces of ciphertexts $\text{Enc}_{US\_1}([0^{(W)}]_1, [0^{(1)}]_1, \ldots, [0^{(m)}]_1), \ldots, \text{Enc}_{US\_n}([0^{(W)}]_n, [0^{(1)}]_n, \ldots, [0^{(m)}]_n)$ obtained at step S116 to the intermediate server 8.

At step S212, the zero dispersion value transferring part 28 of the intermediate server 8 receives the n pieces of ciphertexts $\text{Enc}_{US\_1}([0^{(W)}]_1, [0^{(1)}]_1, \ldots, [0^{(m)}]_1), \ldots, \text{Enc}_{US\_n}([0^{(W)}]_n, [0^{(1)}]_n, \ldots, [0^{(m)}]_n)$ received from the user apparatus 7, and transmits the pieces of the ciphertext $\text{Enc}_{US\_i}([0^{(W)}]_i, [0^{(1)}]_i, \ldots, [0^{(m)}]_i)$ to the authentication server $9_i$, respectively, for i=1, . . . , n.

At step S315, the zero dispersion value decrypting part 48 of the authentication server $9_i$ receives the ciphertext $\text{Enc}_{US\_i}([0^{(W)}]_i, [0^{(1)}]_i, \ldots, [0^{(m)}]_i)$ transferred from the intermediate server 8.

At step S316, the zero dispersion value decrypting part 48 of the authentication server $9_i$ decrypts the ciphertext $\text{Enc}_{US\_i}([0^{(W)}]_i, [0^{(1)}]_i, \ldots, [0^{(m)}]_i)$ received from the intermediate server 8 to obtain m+1 dispersed values $[0^{(W)}]_i, [0^{(1)}]_i, \ldots, [0^{(m)}]_i$, using the common key between the user apparatus 7 and the authentication server $9_i$. The dispersed values $[0^{(W)}]_i, [0^{(1)}]_i, \ldots, [0^{(m)}]_i$ are stored into the dispersed value storing part 42.

Similarly to the multi-party secure authentication method of the first embodiment, the process from step S111 to step S316 may be executed in parallel with the process from step S101 to step S302 or executed separately in advance.

[FOURTH EMBODIMENT]

A multi-party secure authentication system of a fourth embodiment is different from the embodiments described above only in the process of the random number generation phase. A method of configuration of the fourth embodiment can be applied to the multi-party secure authentication systems of the first to third embodiments.

In the following description, points different from the first embodiment will be mainly described. As for parts similar to the first embodiment, description thereof will be omitted.

<<Random Number Generation Phase>>

The process of the random number generation phase according to the fourth embodiment will be described. In this embodiment, it is assumed that a set of combinations of arbitrary n−k+1 authentication servers among the n authentication servers $3_1, \ldots, 3_n$ is indicated by $\{b_1, \ldots, b_B\}$, where B is defined by the following formula:

[Formula 23]

$$B = \binom{n}{n-k+1}$$

A set of combinations of arbitrary n−m+2 authentication servers among the n authentication servers $3_1, \ldots, 3_n$ is indicated by $\{c_1, \ldots, c_C\}$, where C is defined by the following formula:

[Formula 24]

$$C = \binom{n}{n-m+2}$$

A set of combinations of arbitrary n−m+1 authentication servers among the n authentication servers $3_1, \ldots, 3_n$ is indicated by $\{d_1, \ldots, d_D\}$, where D is defined by the following formula:

[Formula 25]

$$D = \binom{n}{n-m+1}$$

Figure 6:
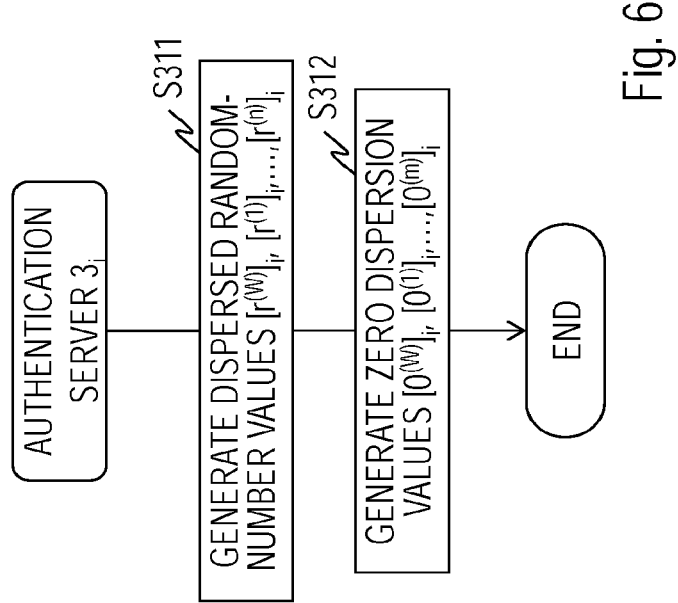
FIG. 6 is a diagram illustrating a process flow for a random number generation phase of the multi-party secure authentication method according to the first embodiment.

At step S311 shown in FIG. 6, the dispersed random-number value generating part 31 of the authentication server $3_i$ generates random numbers or pseudorandom numbers $u^{(W)}_1, \ldots, u^{(W)}_B$ and holds $\{u^{(W)}_{b\_j}\}$ where $i \in b_j$ to obtain dispersed values $[r^{(W)}]_i$. The random numbers $u^{(W)}_1, \ldots, u^{(W)}_B$ may be generated by the user apparatus 1 and transmitted to the authentication servers $3_1, \ldots, 3_n$, or may be mutually generated and mutually transmitted by the authentication servers $3_1, \ldots, 3_n$, or may be generated from seeds of pseudorandom numbers held by the authentication servers $3_1, \ldots, 3_n$ in advance.

Next, for j=1, ..., n, the dispersed random-number value generating part 31 of the authentication server $3_i$ generates random numbers or pseudorandom numbers $u^{(j)}_1, \ldots, u^{(j)}_B$, and holds $\{u^{(j)}_{b\_h}\}$ where $j \in b_h$ to obtain dispersed values $[r^{(j)}]_i$. The random numbers $u^{(j)}_1, \ldots, u^{(j)}_B$ may be generated by the user apparatus 1 and transmitted to the authentication servers $3_1, \ldots, 3_n$, or may be mutually generated and mutually transmitted by the authentication servers $3_1, \ldots, 3_n$, or may be generated from seeds of pseudorandom numbers held by the authentication servers $3_1, \ldots, 3_n$ in advance.

The generated dispersed values $[r^{(W)}]_i, [r^{(1)}]_i, \ldots, [r^{(m)}]_i$ are stored into the dispersed value storing part 42.

At step S312 shown in FIG. 6, the zero dispersion value generating part 32 of the authentication server $3_i$ generates random numbers or pseudorandom numbers $u^{(W)}_1, \ldots, u^{(W)}_C$, holds $\{u^{(W)}_{c\_j}\}$ where $i \in c_j$, and calculates a dispersed value $[0^{(W)}]_i$ by the following formula (15).

[Formula 26]

$$[0^{(W)}]_i = \left( \sum_{c_j}^{i \in c_j} \delta_{c_j, d_1} u^{(W)}_{c_j}, \ldots, \sum_{c_j}^{i \in c_j} \delta_{c_j, d_D} u^{(W)}_{c_j} \right) \quad (15)$$

Here, $\delta_{c\_1}, \ldots, \delta_{c\_D}$ are known constants.

Next, for j=1, ..., m, the dispersed random-number value generating part 31 of the authentication server $3_i$ generates random numbers or pseudorandom numbers $u^{(j)}_1, \ldots, u^{(j)}_C$, holds $\{u^{(j)}_{c\_h}\}$ where $i \in c_h$, and calculates a dispersed value $[0^{(j)}]_i$ by the following formula (16).

[Formula 27]

$$[0^{(j)}]_i = \left( \sum_{c_h}^{i \in c_h} \delta_{c_h, d_1} u^{(j)}_{c_h}, \ldots, \sum_{c_h}^{i \in c_h} \delta_{c_h, d_D} u^{(j)}_{c_h} \right) \quad (16)$$

The generated dispersed values $[0^{(W)}]_i, [0^{(1)}]_i, \ldots, [0^{(m)}]_i$ are stored into the dispersed value storing part 42.

[FIFTH EMBODIMENT]

A multi-party secure authentication system of a fifth embodiment is different from the embodiments described above only in the process of the random number generation phase. A method of configuration of the fifth embodiment can be applied to the multi-party secure authentication systems of the first to third embodiments.

In the following description, points different from the first embodiment will be mainly described. As for parts similar to the first embodiment, description thereof will be omitted.

<<Random Number Generation Phase>>

The process of the random number generation phase according to the fifth embodiment will be described. In the random number generation phase of this embodiment, the process of step S311 is similar to that of the fourth embodiment, and only the process of step S312 is different from that of the fourth embodiment.

At step S312, the zero dispersion value generating part 32 of the authentication server $3_i$ generates random numbers or pseudorandom numbers $u^{(W)}_1, \ldots, u^{(W)}_C$, holds $\{u^{(W)}_{c\_j}\}$ where $i \in c_j$, and calculates a dispersed value $[0^{(W)}]_i$ by the following formula (17).

[Formula 28]

$$[0^{(W)}]_i = i \times \sum_{c_j}^{i \in c_j} f_{c_j}(i) u^{(W)}_{c_j} \quad (17)$$

Here, $f_{c\_j}$ is a unique function for each $u^{(W)}_{c\_j}$ ($1 \le j \le C$), and $f_{c\_j}(0)=1$ and $f_{c\_j}(g)=0$ (where g does not belong to $c_j$) are satisfied.

Next, for j=1, ..., m, the dispersed random-number value generating part 31 of the authentication server $3_i$ generates random numbers or pseudorandom numbers $u^{(j)}_1, \ldots, u^{(j)}_C$, holds $\{u^{(j)}_{c\_h}\}$ where $i \in c_h$, and calculates a dispersed value $[0^{(j)}]_i$ by the following formula (18).

[Formula 29]

$$[0^{(j)}]_i = i \times \sum_{c_h}^{i \in c_h} f_{c_h}(i) u^{(j)}_{c_h} \quad (18)$$

[SIXTH EMBODIMENT]

A multi-party secure authentication system of a sixth embodiment is different from the embodiments described above only in the process of the random number generation phase. A method of configuration of the sixth embodiment can be applied to the multi-party secure authentication systems of the first to third embodiments.

In the following description, points different from the first embodiment will be mainly described. As for parts similar to the first embodiment, description thereof will be omitted.

<<Random Number Generation Phase>>

The process of the random number generation phase according to the sixth embodiment will be described. In the random number generation phase of this embodiment, the process of step S312 is similar to that of the fourth embodiment, and only the process of step S311 is different from that of the fourth embodiment.

At step S311, the dispersed random-number value generating part 31 of the authentication server $3_i$ generates random numbers or pseudorandom numbers $u^{(W)}_1, \ldots, u^{(W)}_B$, holds $\{u^{(W)}{}_{b\_j}\}$ where $i \in b_j$, and calculates a dispersed value $[r^{(W)}]_i$ by the following formula (19).

[Formula 30]

$$[r^{(W)}]_i = \sum_{b_j}^{i \in b_j} f_{b\_j}(i) u_{b_j}^{(W)} \quad (19)$$

Here, $f_{b\_j}$ is a unique function for each $u^{(W)}{}_{b\_j}$ ($1 \leq j \leq B$), and $f_{b\_j}(0)=1$ and $f_{b\_j}(g)=0$ (where g does not belong to $b_j$) are satisfied. This method is described in detail in "Ronald Cramer, Ivan Damgard, and Yuval Ishai, "Share conversion, pseudorandom secret-sharing and applications to secure computation", TCC, Vol. 3378 of Lecture Notes in Computer Science, pp. 342-362, 2005. (Non-patent literature 1)".

Next, for $j=1, \ldots, m$, the dispersed random-number value generating part 31 of the authentication server $3_i$ generates random numbers or pseudorandom numbers $u^{(j)}{}_1, \ldots, u^{(j)}{}_B$, holds $\{u^{(j)}{}_{b\_h}\}$ where $i \in b_h$, and calculates a dispersed value $[r^{(j)}]_i$ by the following formula (20).

[Formula 31]

$$[r^{(j)}]_i = \sum_{b_h}^{i \in b_h} f_{b_h}(i) u_{b_h}^{(j)} \quad (20)$$

[SEVENTH EMBODIMENT]

A multi-party secure authentication system of a seventh embodiment is different from the embodiments described above only in the process of the random number generation phase. A method of configuration of the seventh embodiment can be applied to the multi-party secure authentication systems of the first to third embodiments.

As for the content of the process of the random number generation phase of the seventh embodiment, the content of the process of step S311 is similar to that of the sixth embodiment, and the content of the process of step S312 is similar to that of the fifth embodiment. See the description of the sixth and fifth embodiments above for detailed process procedures.

[EIGHTH EMBODIMENT]

A multi-party secure authentication system of an eighth embodiment is different from the embodiments described above only in the process of the random number generation phase. A method of configuration of the eighth embodiment can be applied to the multi-party secure authentication systems of the first to third embodiments.

In the following description, points different from the first embodiment will be mainly described. As for parts similar to the first embodiment, description thereof will be omitted.

<<Random Number Generation Phase>>

The process of the random number generation phase according to the eighth embodiment will be described. In this embodiment, it is assumed that such arbitrary q authentication servers that $k \leq q \leq n$ is satisfied, among the n authentication servers $3_1, \ldots, 3_n$ participate to perform the process. In the following description, $a_1, \ldots, a_q$ are different q integers each of which is equal to or larger than 1 and equal to or smaller than n.

At S311 shown in FIG. 6, the dispersed random-number value generating part 31 of the authentication server $3_{a\_i}$ generates a random number $u_i$, and disperses the random number $u_i$ into n dispersed values $[u_i]_1, \ldots, [u_i]_n$ using (k, n) secret sharing. For $j=1, \ldots, q$, the dispersed random-number value generating part 31 obtains a ciphertext $Enc_{S\_a\_iS\_a\_j}([u_i]_{a\_j})$, which is obtained by encrypting the dispersed value $[u_i]_{a\_j}$ using a common key between the $a_j$-th authentication server $3_{a\_j}$ and the $a_i$-th authentication server $3_{a\_i}$. For $j=1, \ldots, q$, the dispersed random-number value generating part 31 transmits the ciphertext $Enc_{S\_a\_iS\_a\_j}([u_i]_{a\_j})$ to the authentication server $3_{a\_j}$.

Next, the dispersed random-number value generating part 31 of the authentication server $3_{a\_i}$ receives q-1 pieces of ciphertexts $Enc_{S\_a\_1S\_a\_i}([u_1]_{a\_i}), \ldots, Enc_{S\_a\_qS\_a\_i}([u_q]_{a\_i})$ (excluding $Enc_{S\_a\_iS\_a\_i}([u_i]_{a\_i})$) from q-1 authentication server $3_{a\_j}$ ($j=1, \ldots, q$; $a_j \neq a_i$); and, for $j=1, \ldots, q$, decrypts the ciphertext $Enc_{S\_a\_jS\_a\_i}([u_j]_{a\_i})$ to obtain a dispersed value $[u_j]_{a\_i}$, using the common key between the $a_j$-th authentication server $3_{a\_j}$ and the $a_i$-th authentication server $3_{a\_i}$. As a result, the dispersed random-number value generating part 31 obtains q dispersed values $[u_1]_{a\_i}, \ldots, [u_q]_{a\_i}$ together with the dispersed value $[u_i]_{a\_i}$ generated by the dispersed random-number value generating part 31 itself.

Next, the dispersed random-number value generating part 31 of the authentication server $3_{a\_i}$ calculates a vector $\vec{u}' = A \vec{u}$, assuming A as a $q \times (q-k+1)$ matrix and regarding $[U_1]_{a\_i}, \ldots, [u_q]_{a\_i}$ as a column vector $\vec{u}$.

As the matrix A, for example, a vandermonde matrix or a Hyper-Invertible matrix can be used. See "Zuzana Beerliova-Trubiniova and Martin Hirt, "Perfectly-secure mpc with linear communication complexity", TCC, Vol. 4948 of Lecture Notes in Computer Science, pp. 213-230, 2008" for details of the Hyper-Invertible matrix.

Next, the dispersed random-number value generating part 31 of the authentication server $3_{a\_i}$ regards the elements of the vector $\vec{u}'$ as $[r^{(W)}]_{a\_i}, [r^{(1)}]_{a\_i}, \ldots, [r^{(m)}]_{a\_i}$, respectively. When $q-k+1 < m+1$ is satisfied, step S311 is executed again from the beginning to generate the vector $\vec{u}'$ additionally, and this is repeated until m+1 elements are obtained. On the contrary, if more than m+1 elements are obtained, the excessive elements are stored to be used for the next authentication.

At step S312 shown in FIG. 6, the zero dispersion value generating part 32 of the authentication server $3_{a\_i}$ generates a random number $u_i$, and disperses the random number $u_i$ into n dispersed values $[u_i]_1, \ldots, [u_i]_n$ using (m−1,n) secret sharing. For $j=1, \ldots, q$, the dispersed random-number value generating part 31 obtains a ciphertext $Enc_{S\_a\_iS\_a\_j}([u_i]_{a\_j})$, which is obtained by encrypting the dispersed value $[u_i]_{a\_j}$ using the common key between the $a_j$-th authentication server $3_{a\_j}$ and the $a_i$-th authentication server $3_{a\_i}$. For $j=1, \ldots, q$, the dispersed random-number value generating part 31 transmits the ciphertext $Enc_{S\_a\_iS\_a\_j}([u_i]_{a\_j})$ to the authentication server $3_{a\_j}$.

Next, the dispersed random-number value generating part 31 of the authentication server $3_{a\_i}$ receives q-1 pieces of ciphertexts $Enc_{S\_a\_1S\_a\_i}([u_1]_{a\_i}), \ldots, Enc_{S\_a\_qS\_a\_i}([u_q]_{a\_i})$ (excluding $Enc_{S\_a\_iS\_a\_i}([u_i]_{a\_i})$) from q-1 authentication server $3_{a\_j}$ ($j=1, \ldots, q$; $a_j \neq a_i$); and, for $j=1, \ldots, q$, decrypts the ciphertext $Enc_{S\_a\_jS\_a\_i}([u_j]_{a\_i})$ to obtain a dispersed value $[u_j]_{a\_i}$, using the common key between the $a_j$-th authentication server $3_{a\_j}$ and the $a_i$-th authentication server $3_{a\_i}$. As a result, the dispersed random-number value generating part 31 obtains q dispersed values $[u_1]_{a\_i}, \ldots, [u_q]_{a\_i}$ together with the dispersed value $[u_i]_{a\_i}$ generated by the dispersed random-number value generating part 31 itself.

Next, the dispersed random-number value generating part 31 of the authentication server $3_{a\_i}$ calculates a vector $\vec{u}' = A \vec{u}$, assuming A as a $q \times (q-k+1)$ matrix and regarding $[u_1]_{a\_i}, \ldots, [u_q]_{a\_i}$ as a column vector $\vec{u}$.

Next, the dispersed random-number value generating part 31 of the authentication server $3_{a\_i}$ regards values obtained by multiplying the elements of the vector $\vec{u}'$ by $a_i$ as $[0^{(W)}]_{a\_i}, [0^{(1)}]_{a\_i}, \ldots, [0^{(m)}]_{a\_i}$, respectively. When $q-k+1 < m+1$ is satisfied, step S311 is executed again from the beginning to generate the vector $\vec{u}'$ additionally, and this is repeated until m+1 elements are obtained. On the contrary, if more than m+1 elements are obtained, the excessive elements are stored to be used for the next authentication.

[NINTH EMBODIMENT]

A multi-party secure authentication system of a ninth embodiment is different from the embodiments described above only in the process of the random number update phase. A method of configuration of the ninth embodiment can be applied to the multi-party secure authentication systems of the first to third embodiments.

Since the content of the process of the random number update phase of the ninth embodiment is similar to the content of the process of the random number generation phase of the fourth embodiment, see the description of the fourth embodiment described above.

[TENTH EMBODIMENT]

A multi-party secure authentication system of a tenth embodiment is different from the embodiments described above only in the process of the random number update phase. A method of configuration of the tenth embodiment can be applied to the multi-party secure authentication systems of the first to third embodiments.

Since the content of the process of the random number update phase of the tenth embodiment is similar to the content of the process of the random number generation phase of the fifth embodiment, see the description of the fifth embodiment described above.

[ELEVENTH EMBODIMENT]

A multi-party secure authentication system of an eleventh embodiment is different from the embodiments described above only in the process of the random number update phase. A method of configuration of the eleventh embodiment can be applied to the multi-party secure authentication systems of the first to third embodiments.

Since the content of the process of the random number update phase of the eleventh embodiment is similar to the content of the process of the random number generation phase of the sixth embodiment, see the description of the sixth embodiment described above.

[TWELFTH EMBODIMENT]

A multi-party secure authentication system of a twelfth embodiment is different from the embodiments described above only in the process of the random number update phase. A method of configuration of the twelfth embodiment can be applied to the multi-party secure authentication systems of the first to third embodiments.

Since the content of the process of the random number update phase of the twelfth embodiment is similar to the content of the process of the random number generation phase of the seventh embodiment, see the description of the seventh embodiment described above.

[THIRTEENTH EMBODIMENT]

A multi-party secure authentication system of a thirteenth embodiment is different from the embodiments described above only in the process of the random number update phase. A method of configuration of the thirteenth embodiment can be applied to the multi-party secure authentication systems of the first to third embodiments.

Since the content of the process of the random number update phase of the thirteenth embodiment is similar to the content of the process of the random number generation phase of the eighth embodiment, see the description of the eighth embodiment described above.

[MODIFICATION]

Though, in each embodiment described above, description has been made on a configuration in which a multi-party secure authentication system comprises the user apparatus 1, the intermediate server 2 and n authentication servers $3_1, \ldots, 3_n$ as an example, it is also possible to configure the intermediate server 2 and one authentication server 3 as one intermediate authentication server. That is, the multi-party secure authentication system can be configured to comprise, for example, the user apparatus 1, n−1 authentication servers $3_1, \ldots, 3_{n-1}$, and one intermediate authentication server $3_n$.

The intermediate authentication server $3_n$ is configured, comprising both of the component parts the intermediate server 2 is provided with and the component parts the authentication server 3 is provided with. However, since data transmitted and received between the intermediate server 2 and the authentication server 3 in the embodiments described above can be handed over inside the server via the memory 102, it is not necessarily required to encrypt the data. Specifically, it becomes unnecessary to encrypt an intermediate server verification value $q_{a\_n}^{(W)}$ which is encrypted by a common key between the intermediate server 2 and the authentication server 3. Therefore, the intermediate authentication server $3_n$ does not have to be provided with the intermediate server's verification value encrypting part 35. Further, since it is possible to perform verification at the intermediate authentication server $3_n$ with an authentication server verification value, the intermediate server verification value becomes unnecessary. Therefore, the intermediate authentication server $3_n$ may not be provided with the intermediate server's verification value generating part 34, the intermediate server's verification value encrypting part 35, the intermediate server's verification value decrypting part 23 and the intermediate server's verifying part 24.

Further, in the case where the intermediate server 2 and the authentication server 3 are configured as one intermediate authentication server $3_n$, a common key between the authentication server $3_n$ and other authentication servers $3_1, \ldots, 3_{n-1}$ can be used also as a common key between the intermediate server 2 and each of the authentication servers $3_1, \ldots, 3_n$, and, therefore, the number of common keys in the whole system can be reduced by n.

[APPLICATION EXAMPLE]

The multi-party secure authentication technique of the present invention can be applied to various application systems using password authentication.

For example, it is also possible to make a configuration in which, when a user receives a service of an information system by an external third party via a Web page, each service may provide the service for the user after the authentication of the first or second embodiment is performed with each service provider as an authentication server. The external service may be a service provided by a plurality of servers in cooperation with one another or may be a service provided by each single server.

Further, an application example is conceivable in which the multi-party secure authentication technique of the third embodiment is used as a single sign-on system. By making a such a configuration, a user can receive each service of each server with one password. By using this invention, it is possible to reduce the risk of leakage due to impersonation in the process of authentication by single sign-on.

Moreover, an application example is conceivable in which, for example, the multi-party secure authentication technique of the third embodiment is used for a storage service using (k, n) secret sharing. The (k, n) secret sharing is a division method of dividing data into n dispersed values, and it is a secret sharing system in which, though information about original data cannot be obtained at all with any k−1 dispersed values among the n dispersed values, the original data can be completely reconstructed if there are arbitrary k dispersed values. Though the storage service using the (k, n) secret sharing is a service provided by servers in cooperation with one another, it is not necessary for the servers to directly communicate with one another. The multi-party secure authentication technique of this invention also does not require communication among servers, the application example can be said to be such that the advantage can be sufficiently enjoyed.

[EFFECTS OF THE INVENTION]

By using this invention, it is possible to prevent an unauthorized person to personate a user and cause authentication to be successful even via an intermediate server such as a Web server. It is also assumed that the authorized person is an intermediate party or a server. That is, it is included that neither an intermediate party nor a server knows a password.

Further, this invention realizes the following four requirements in addition to the advantage that a Web service model is applicable.

1. A user does not have to install a plurality of passwords or a complicated certificate.
2. Even an intermediate party or a server cannot perform impersonation.
3. Communication channels are not required among servers.
4. Since the number of communications before a response is given to a user is minimized, response time can be minimized in the Internet environment.

The above requirements 1 and 4 are self-evident. As for the requirement 2, though the merit of taking the trouble to pass through authentication from the outside in order to do wrong is small in the case of a model where a server is a single entity, because the server itself has data, there is a merit in reading data held by other servers from the outside in the case where there are a plurality of servers each of which has different data. Especially in secret sharing, this problem is serious, because the effect of security is lost when two or more pieces of data are collected. The requirement 3 means that, even on servers which do not have communication channels among them at the time of constructing a system, a service by the servers in cooperation with one another can be developed. For example, an application provider can develop the provider's services on a plurality of suitable cloud services. In other words, it is not necessary for the cloud services to be in cooperation with one another.

In this invention, one password is required for the above requirement 1, and, for the requirement 2, the password is protected by such secret sharing that neither a server nor an intermediate party can know the password. A hash value of a password is not sufficient because a local dictionary attack at a server is possible. Further, for the above requirements 3 and 4, secrecy circuit calculation with a small number of communications via an intermediate party is dedicatedly designed, though well-known secrecy circuit calculation can be used if communication among servers is permitted (for the above requirement 3), and, settings equal to those in the case where there is no intermediate party can be made with the use of an encrypted communication channel if the number of communications is increased, (for the above requirement 4).

[PROGRAM AND RECORDING MEDIUM]

This invention is not limited to the embodiments described above, and it goes without saying that modifications can be made appropriately within a range not departing from the spirit of this invention. The various processes described in the above embodiments are not only executed in a time series according to the order of description but may be executed in parallel or separately according to the processing capacity of apparatuses which execute the processes or as necessary.

Further, in the case where the various processing functions in each apparatus described in the above embodiments are realized by a computer, the content of the processes of the functions which each apparatus is to be provided with is written by a program. By executing this program on the computer, the various processing functions on each apparatus is realized on the computer.

The program in which the content of the processes is written can be recorded in a computer-readable recording medium. As the computer readable recording medium, any recording medium is possible such as a magnetic recording device, an optical disk, a magneto-optical recording medium and a semiconductor memory.

Further, distribution of this program is performed, for example, by selling, transferring or lending a portable recording medium, such as a DVD and a CD-ROM, in which the program is recorded. Moreover, a configuration is also possible in which this program is stored in a storage device of a server computer and distributed by transferring the program from the server computer to other computers via a network.

For example, the computer which executes such a program first stores the program recorded in the portable recording medium or the program transferred from the server computer into its storage device once. Then, at the time of executing a process, this computer reads the program stored in its recording medium and executes a process in accordance with the read program. Further, as another embodiment of this program, the computer may read the program directly from the portable recording medium and execute a process in accordance with the program. Furthermore, each time a program is transferred from the server computer to this computer, this computer may sequentially execute a process in accordance with the received program. Further, such a configuration is also possible that the program is not transferred from the server computer to this computer, but the above-described processes are executed by a so-called ASP (Application Service Provider) type service in which processing functions are realized only by an instruction to execute the program and acquisition of a result. It is assumed that the program in the present embodiments includes information which is provided for processing by an electronic computer and is equivalent to a program (such as data which is not a direct command to a computer but has a nature of specifying processing of the computer).

While the inventive device is configured by causing a computer to execute a predetermined program in the embodiments described above, at least some of the processes may be implemented by hardware.

What is claimed is:
1. A multi-party secure authentication system comprising a user apparatus, an intermediate server and n authentication servers, wherein n is an integer equal to or larger than 3; k is an integer equal to or larger than 2; n≥3 is satisfied; $a_1, \ldots, a_m$ are m different integers each of which is equal to or larger than 1 and equal to or smaller than n 2k−1≤n is satisfied; k≤m is satisfied; m≤n is satisfied; (k, n) secret sharing is secret sharing in which reconstruction is possible if there are k or more dispersed values among n dispersed values; $[r^{(W)}]_1, \ldots, [r^{(W)}]_n$ are such dispersed values by the (k, n) secret sharing that a random number $r^{(W)}$ is obtained when $[r^{(W)}]_1, \ldots, [r^{(W)}]_n$ are reconstructed; $[r^{(i)}]_1, \ldots, [r^{(i)}]_n$ (i=1, ..., n) are such dispersed values by the (k, n) secret sharing that a random number $r^{(i)}$ is obtained when $[r^{(i)}]_1, \ldots, [r^{(i)}]_n$ are reconstructed; $[0^{(W)}]_1, \ldots, [0^{(W)}]_n$ are such dispersed values by the (k, n) secret sharing that 0 is obtained when $[0^{(W)}]_1, \ldots, [0^{(W)}]_n$ are reconstructed; and $[0^{(a\_i)}]_1, \ldots, [0^{(a\_i)}]_n$ (i=1, ..., m) are such dispersed values by the (k, n) secret sharing that 0 is obtained when $[0^{(a\_i)}]_1, \ldots, [0^{(a\_i)}]_n$ are reconstructed;

the user apparatus comprises circuitry configured to:
  disperse an inputted password w' into n dispersed values $[w']_1, \ldots, [w']_n$, and
  obtain a ciphertext $Enc_{US\_i}([w']_i)$, which is obtained by encrypting a dispersed value $[w']_i$, using a common key between the user apparatus and an i-th one of the authentication servers, for i=1, ..., n;

the intermediate server comprises circuitry configured to:
  transmit the ciphertext $Enc_{US\_i}([w']_i)$ received from the user apparatus to the i-th authentication server, for i=1, ..., n,
  decrypt a ciphertext $Enc_{WS\_a\_i}(q_{a\_i}^{(W)})$ received from an $a_i$-th one of the authentication servers to obtain a verification value $q_{a\_i}^{(W)}$, using a common key between the intermediate server and the $a_i$-th authentication server, for i=1, ..., m, and
  verify whether a sum total of the verification values $q_{a\_1}^{(W)}, \ldots, q_{a\_m}^{(W)}$ is equal to 0 or not; and the authentication server comprises circuitry configured to:
  store the i-th dispersed value $[w]_i$ among dispersed values $[w]_1, \ldots, [w]_n$ obtained by dispersing a password w into n pieces, the i-th dispersed value $[r^{(W)}]_i$, and the respective i-th dispersed values $[r^{(1)}]_i, \ldots, [r^{(m)}]_i$,
  decrypt the ciphertext $Enc_{US\_i}([w']_i)$ received from the intermediate server to obtain the dispersed value $[w']_i$, using the common key between the user apparatus and the authentication server,
  determine a verification value $q_{a\_i}^{(W)}$ by the following formula:

$$q_{a_i}^{(W)} = \lambda_{a_i}^{(W)} [r^{(W)}]_{a_i} ([w]_{a_i} - [w']_{a_i}) + \hat{\lambda}_{a_i}^{(W)} [0^{(W)}]_{a_i}$$

wherein $\lambda_{a\_i}^{(W)}$ (i∈1, ..., m) indicates a constant satisfying the following formula:

$$r^{(W)} w = \sum_{i=1}^{m} \lambda_{a_i}^{(W)} [r^{(W)}]_{a_i} [w]_{a_i}$$

$\hat{\lambda}_{a\_i}^{(W)}$ (i∈1, ..., m) indicates a constant satisfying the following formula:

$$0 = \sum_{i=1}^{m} \hat{\lambda}_{a_i}^{(W)} [0^{(W)}]_{a_i}$$

$\lambda_{a\_i}^{(j)}$ (i∈1, ..., m) indicates a constant satisfying the following formula:

$$r^{(j)} w = \sum_{i=1}^{m} \lambda_{a_i}^{(j)} [r^{(j)}]_{a_i} [w]_{a_i}$$

and $\hat{\lambda}_{a\_i}^{(j)}$ (i∈1, ..., m) indicates a constant satisfying the following formula:

$$0 = \sum_{i=1}^{m} \hat{\lambda}_{a_i}^{(j)} [0^{(j)}]_{a_i}$$

obtaining the ciphertext $Enc_{WS\_a\_i}(q_{a\_i}^{(W)})$, which is obtained by encrypting the verification value $q_{a\_i}^{(W)}$, using a common key between the intermediate server and the authentication server;
  determining a verification value $q_{a\_i}^{(a\_j)}$, for j=1, ..., m, by the following formula:

$$q_{a_i}^{(aj)} = \lambda_{a_i}^{(aj)} [r^{(aj)}]_{a_i} ([w]_{a_i} - [w']_{a_i}) + \hat{\lambda}_{a_i}^{(aj)} [0^{(aj)}]_{a_i}$$

obtaining a ciphertext $Enc_{S\_a\_iS\_a\_j}(q_{a\_i}^{(a\_j)})$, which is obtained by encrypting the verification value $q_{a\_i}^{(a\_j)}$, using a common key between an $a_j$-th one of the authentication servers and the authentication server, for j=1, ..., m;
  decrypt the ciphertext $Enc_{S\_a\_iS\_a\_j}(q_{a\_j}^{(a\_i)})$ received from the $a_j$-th authentication server to obtain the verification value $q_{a\_j}^{(a\_i)}$, using the common key between the $a_j$-th authentication server and the authentication server, for j=1, ..., m; and
  verify whether a sum total of the verification values $q_{a\_1}^{(a\_i)}, \ldots, q_{a\_m}^{(a\_i)}$ is equal to 0 or not, wherein the intermediate sever and the n authentication setvers simultaneously authenticate the user apparatus.

2. The multi-party secure authentication system according to claim 1, wherein the authentication server further comprises:
  generating a random number $t_{a\_i}$;
  obtaining a ciphertext $Enc_{US\_a\_i}(t_{a\_i})$, which is obtained by encrypting the random numbers $t_{a\_i}$, using the common key between the user apparatus and the authentication server; and
  verify whether a random number $t_{a\_i}$ obtained by decrypting a ciphertext $Enc_{US\_a\_i}(t_{a\_i}, [w']_{a\_i})$ received from the intermediate server is equal to the random number $t_{a\_i}$ generated by the random number generating part;

the circuitry of the intermediate server is further configured to:
  transmit the ciphertext $Enc_{US\_a\_j}(t_{a\_j})$ received from the $a_j$-th authentication server to the user apparatus, for j=1, ..., m; and the circuitry of the user apparatus is further configured to:
  decrypt the ciphertext $Enc_{US\_a\_i}(t_{a\_i})$ received from the intermediate server using a common key between the user apparatus and the $a_i$-th authentication server, for i=1, ..., m; and
  obtains ciphertext the $Enc_{US\_a\_i}(t_{a\_i}, [w']_{a\_i})$, which is obtained by decrypting the dispersed value $[w']_i$ together with the random numbers $t_{a\_i}$, using the common key between the user apparatus and the i-th authentication server, for i=1, ..., n.

3. The multi-party secure authentication system according to claim 1, wherein
the circuitry of the authentication server is further configured to:
generating part generating the dispersed values $[r^{(W)}]_i$, $[r^{(1)}]_i, \ldots, [r^{(n)}]_i$; and
generating part generating the dispersed values $[0^{(W)}]_i$, $[0^{(a\_1)}]_i, \ldots, [0^{(a\_m)}]_i$.

4. The multi-party secure authentication system according to claim 1, wherein
the circuitry of the user apparatus is further configured to:
generate the random numbers $r^{(W)}, r^{(1)}, \ldots, r^{(n)}$ and dispersing each of the random numbers $r^{(W)}, r^{(1)}, \ldots, r^{(n)}$ into n pieces to generate the dispersed values $[r^{(W)}]_1, \ldots, [r^{(W)}]_n$ and the dispersed values $[r^{(i)}]_1, \ldots, [r^{(i)}]_n$ (i=1, . . . , n),
obtain a ciphertext $Enc_{US\_i}([r^{(W)}]_i, [r^{(i)}]_i, \ldots, [r^{(n)}]_i)$, which is obtained by encrypting dispersed values $[r^{(W)}]_i, [r^{(i)}]_i, \ldots, [r^{(n)}]_i$, using the common key between the user apparatus and the i-th authentication server, for i=1, . . . , n,
generate the dispersed values $[0^{(W)}]_1, \ldots, [0^{(W)}]_n$ and the dispersed values $[0^{(a\_i)}]_1, \ldots, [0^{(a\_i)}]_n$ (i=1, . . . , m), and
obtain a ciphertext $Enc_{US\_i}([0^{(W)}]_i, [0^{(a\_1)}]_i, \ldots, [0^{(a\_m)}]_i)$, which is obtained by encrypting dispersed values $[0^{(W)}]_i, [0^{(1)}]_i, \ldots, [0^{(m)}]_i$, using the common key between the user apparatus and the $a_i$-th authentication server, for i=1, . . . , m; and
the circuitry of the intermediate server is further configured to:
transmit the ciphertext $Enc_{US\_i}([r^{(W)}]_i, [r^{(i)}]_i, \ldots, [r^{(n)}]_i)$ received from the user apparatus to the i-th authentication server, for i=1, . . . , n, and
transmit the ciphertext $Enc_{US\_i}([0^{(W)}]_i, [0^{(a\_1)}]_i, \ldots, [0^{(a\_m)}]_i)$ received from the user apparatus to the i-th authentication server, for i=1, . . . , n.

5. The multi-party secure authentication system according to claim 2, wherein the circuitry of the authentication server is further configured to:
generate the dispersed values [r(W)]i, [r(1)]i, . . . , [r(n)]I, and
generate the dispersed values [0(W)]i, [0(a_1)]i, . . . , [0(a_m)]i.

6. The multi-party secure authentication system according to claim 2, wherein
the circuitry of the user apparatus is further configured to:
generate the random numbers r(W), r(1), . . . , r(n) and dispersing each of the random numbers r(W), r(1), . . . , r(n) into n pieces to generate the dispersed values [r(W)]1, . . . , [r(W)]n and the dispersed values [r(i)]1, . . . , [r(i)]n (i=1, . . . , n),
obtain a ciphertext EncUS_i([r(W)]i, [r(i)]i, . . . , [r(n)]i), which is obtained by encrypting dispersed values [r(W)]i, [r(i)]i, . . . , [r(n)]i, using the common key between the user apparatus and the i-th authentication server, for i=1, . . . , n,
generate the dispersed values [0(W)]1, . . . , [0(W)]n and the dispersed values [0(a_i)]1, . . . , [0(a_i)]n (i=1, . . . , m), and
obtain a ciphertext EncUS_i([0(W)]i, [0(a_1)]i, . . . , [0(a_m)]i), which is obtained by encrypting dispersed values ([0(W)]i, [0(1)]i, . . . , [0(m)]i, using the common key between the user apparatus and the ai-th authentication server, for i=1, . . . , m; and the circuitry of the intermediate is further configured to:
transmit the ciphertext EncUS_i([r(W)]i, [r(i)]i, . . . , [r(n)]i) received from the user apparatus to the i-th authentication server, for i=1, . . . , n, and
transmit the ciphertext EncUS_i([0(W)]i, [0(a_1)]i, . . . , [0(a_m)]i) received from the user apparatus to the i-th authentication server, for i=1, . . . , n.

7. A multi-party secure authentication system comprising a user apparatus, an immediate authentication server and n−1 authentication servers, wherein
n is an integer equal to or larger than 3; k is an integer equal to or larger than 2; n≥3 is satisfied; $a_1, \ldots, a_m$ are m different integers each of which is equal to or larger than 1 and equal to or smaller than n, where $a_m = n$ is satisfied; 2k−1≤n is satisfied; k≤m is satisfied; m≤n is satisfied; (k, n) secret sharing is secret sharing in which reconstruction is possible if there are k or more dispersed values among n dispersed values; $[r^{(i)}]_1, \ldots, [r^{(i)}]_n$ (i=1, . . . , n) are such dispersed values by the (k, n) secret sharing that a random number $r^{(i)}$ is obtained when $[r^{(i)}]_1, \ldots, [r^{(i)}]_n$ are reconstructed; and $[0^{(a\_i)}]_1, \ldots, [0^{(a\_i)}]_n$ (i=1, . . . , m) are such dispersed values by the (k, n) secret sharing that 0 is obtained when $[0^{(a\_i)}]_1, \ldots, [0^{(a\_i)}]_n$ are reconstructed;
$\lambda_{a\_i}^{(j)}$ (i∈1, . . . , m) indicates a constant satisfying the following formula:

$$r^{(j)}w = \sum_{i=1}^{m} \lambda_{a_i}^{(j)} [r^{(j)}]_{a_i} [w]_{a_i}$$

$\hat{\lambda}_{a\_i}^{(j)}$ (i∈1, . . . , m) indicates a constant satisfying the following formula:

$$0 = \sum_{i=1}^{m} \hat{\lambda}_{a_i}^{(j)} [0^{(j)}]_{a_i}$$

the user apparatus comprises:
circuitry configured to
disperse an inputted password w' into n dispersed values $[w']_1, \ldots, [w']_n$, and
obtain a ciphertext $Enc_{US\_i}([w']_i)$, which is obtained by encrypting a dispersed value $[w']_i$, using a common key between the user apparatus and an i-th one of the authentication servers, and obtaining a ciphertext $Enc_{US\_n}([w']_n)$, which is obtained by encrypting a dispersed value $[w']_n$, using a common key between the user apparatus and the intermediate authentication server, for i=1, . . . , n−1;
the intermediate authentication server comprises:
circuitry configured to:
store the n-th dispersed value $[w]_n$ among dispersed values $[w]_1, \ldots, [w]_n$ obtained by dispersing a password w into n pieces, and the respective n-th dispersed values $[r^{(1)}]_n, \ldots, [r^{(n)}]_n$;
transmit the ciphertext $Enc_{US\_i}([w']_i)$ received from the user apparatus to the i-th authentication server, for i=1, . . . , n−1,
decrypt the ciphertext $Enc_{US\_n}([w']_n)$ to obtain the dispersed value $[w']_n$, using the common key between the user apparatus and the intermediate authentication server, determine a verification value $q_{a\_m}^{(a\_j)}$, for j=1, ..., m, by the following formula:

$$q_{a_m}^{(aj)}=\lambda_{a_m}^{(aj)}[r^{(aj)}]_{a_m}([w]_{a_m}-[w']_{a_m})+\hat{\lambda}_{a_m}^{(aj)}[0^{(aj)}]_{a_m}$$

obtain a ciphertext $Enc_{S\_a\_mS\_a\_j}(q_{a\_m}^{(a\_j)})$, which is obtained by encrypting the verification value $q_{a\_m}^{(a\_j)}$, using a common key between an $a_j$-th one of the authentication servers and the intermediate authentication server, for j=1, ..., m-1, decrypt a ciphertext $Enc_{S\_a\_mS\_a\_j}(q_{a\_j}^{(a\_m)})$ received from the $a_j$-th authentication server to obtain the verification value $q_{a\_j}^{(a\_m)}$, using the common key between the $a_j$-th authentication server and the intermediate authentication server, for j=1, ..., m-1, and verify whether a sum total of the verification values $q_{a\_1}^{(a\_m)}, \ldots, q_{a\_m}^{(a\_m)}$ is equal to 0 or not; and the authentication server comprises:
circuitry configured to:
store the i-th dispersed value $[w]_i$ and the respective i-th dispersed values $[r^{(1)}]_i, \ldots, [r^{(n)}]_i$, decrypt the ciphertext $Enc_{US\_i}([w']_i)$ received from the intermediate authentication server to obtain the dispersed value $[w']_i$, using a common key between the user apparatus and the authentication server, determine a verification value $q_{a\_i}^{(a\_j)}$, for j=1, ..., m, by the following formula:

$$q_{a_i}^{(aj)}=\lambda_{a_i}^{(aj)}[r^{(aj)}]_{a_i}([w]_{a_i}-[w']_{a_i})+\hat{\lambda}_{a_i}^{(aj)}[0^{(aj)}]_{a_i}$$

obtain a ciphertext $Enc_{S\_a\_iS\_a\_j}(q_{a\_i}^{(a\_j)})$, which is obtained by encrypting the verification value $q_{a\_i}^{(a\_j)}$, using a common key between the $a_j$-th authentication server or the intermediate authentication server, and the authentication server, for j=1, ..., m, decrypt the ciphertext $Enc_{S\_a\_iS\_a\_j}(q_{a\_j}^{(a\_i)})$ received from the $a_j$-th authentication server to obtain the verification value $q_{a\_j}^{(a\_i)}$, using the common key between the $a_j$-th authentication server or the intermediate authentication server, and the authentication server, for j=1, ..., m, and verify whether a sum total of the verification values $q_{a\_1}^{(a\_i)}, \ldots, q_{a\_m}^{(a\_i)}$ is equal to 0 or not, wherein the intermediate sever and the n authentication servers simultaneously authenticate the user apparatus.

8. An authentication server, wherein n is an integer equal to or larger than; k is an integer equal to or larger than 2; n≥3 is satisfied; 2k−1≤n is satisfied; $a_1, \ldots, a_m$ are m different integers each of which is equal to or larger than 1 and equal to or smaller than n; k≤m is satisfied; m≤n is satisfied; (k, n) secret sharing is secret sharing in which reconstruction is possible if there are k or more dispersed values among n dispersed values; $[r^{(W)}]_1, \ldots, [r^{(W)}]_n$ are such dispersed values by the (k, n) secret sharing that a random number $r^{(W)}$ is obtained when $[r^{(W)}]_1, \ldots, [r^{(W)}]_n$ are reconstructed; $[r^{(i)}]_1, \ldots, [r^{(i)}]_n$ (i=1, ..., n) are such dispersed values by the (k, n) secret sharing that a random number $r^{(i)}$ is obtained when $[r^{(i)}]_1, \ldots, [r^{(i)}]_n$ are reconstructed; $[0^{(W)}]_1, \ldots, [0^{(W)}]_n$ are such dispersed values by the (k, n) secret sharing that 0 is obtained when $[0^{(W)}]_1, \ldots, [0^{(W)}]_n$ are reconstructed; and $[0^{(a\_i)}]_1, \ldots, [0^{(a\_i)}]_n$ (i=1, ..., m) are such dispersed value by the (k, n) secret sharing that 0 is obtained when $[0^{(a\_i)}]_1, \ldots, [0^{(a\_i)}]_n$ are reconstructed;

the authentication server comprises:
circuitry configured to:
store an i-th dispersed value $[w]_i$ among dispersed values $[w]_1, \ldots, [w]_n$ obtained by dispersing a password w into n pieces, the i-th dispersed value $[r^{(W)}]_i$, and the respective i-th dispersed values $[r^{(i)}]_i, \ldots, [r^{(n)}]_i$, decrypt a ciphertext $Enc_{US\_i}([w']_i)$ received from an intermediate server to obtain a dispersed value $[w']_i$, which is obtained by dispersing a password w' into n pieces, using a common key between a user apparatus and the authentication server, determine a verification value $q_{a\_i}^{(W)}$ by the following formula:

$$q_{a_i}^{(W)}=\lambda_{a_i}^{(W)}[r^{(W)}]_{a_i}([w]_{a_i}-[w']_{a_i})+\hat{\lambda}_{a_i}^{(W)}[0^{(W)}]_{a_i}$$

wherein $\lambda_{a\_i}^{(W)}$ (i∈1, ..., m) indicates a constant satisfying the following formula:

$$r^{(W)}w = \sum_{i=1}^{m} \lambda_{a_i}^{(W)}[r^{(W)}]_{a_i}[w]_{a_i}$$

$\hat{\lambda}_{a\_i}^{(W)}$ (i∈1, ..., m) indicates a constant satisfying the following formula:

$$0 = \sum_{i=1}^{m} \hat{\lambda}_{a_i}^{(W)}[0^{(W)}]_{a_i}$$

$\lambda_{a\_i}^{(j)}$ (i∈1, ..., m) indicates a constant satisfying the following formula:

$$r^{(j)}w = \sum_{i=1}^{m} \lambda_{a_i}^{(j)}[r^{(j)}]_{a_i}[w]_{a_i}$$

and $\hat{\lambda}_{a\_i}^{(j)}$ (i∈1, ..., m) indicates a constant satisfying the following formula:

$$0 = \sum_{i=1}^{m} \hat{\lambda}_{a_i}^{(j)}[0^{(j)}]_{a_i}$$

obtain a ciphertext $Enc_{WS\_a\_i}(q_{a\_i}^{(W)})$, which is obtained by encrypting the verification value $q_{a\_i}^{(W)}$, using a common key between the intermediate server and the authentication server, determine a verification value $q_{a\_i}^{(a\_j)}$, for j=1, ..., m, by the following formula:

$$q_{a_i}^{(aj)}=\lambda_{a_i}^{(aj)}[r^{(aj)}]_{a_i}([w]_{a_i}-[w']_{a_i})+\hat{\lambda}_{a_i}^{(aj)}[0^{(aj)}]_{a_i}$$

obtain a ciphertext $Enc_{S\_a\_iS\_a\_j}(q_{a\_i}^{(a\_j)})$, which is obtained by encrypting the verification value $q_{a\_i}^{(a\_j)}$, using a common key between an $a_j$-th authentication server and the authentication server, for j=1, ..., m, decrypt the ciphertext $Enc_{S\_a\_iS\_a\_j}(q_{a\_j}^{(a\_i)})$, received from the $a_j$-th authentication server to obtain the verification value $q_{a\_j}^{(a\_i)}$, using the common key between the $a_j$-th authentication server and the authentication server, for j=1, ..., m, and verify whether a sum total of the verification values a $q_{a\_1}^{(a\_i)}, \ldots, q_{a\_m}^{(a\_i)}$ is equal to 0 or not, wherein the authentication server and the intermediate server simultaneously authenticate the user apparatus.

9. An intermediate server wherein n is an integer equal to or larger than 3; k is an integer equal to or larger than 2; n≥3 is satisfied; 2k−1≤n is satisfied; $a_1, \ldots, a_m$ are m different integers each of which is equal to or larger than 1 and equal to or smaller than n; k≤m is satisfied; and m≤n is satisfied; and the intermediate server comprises:

circuitry configured to:

transmit a ciphertext $\text{Enc}_{US\_i}([w']_i)$ received from a user apparatus to an i-th authentication server, for i=1, . . . , n, decrypt ciphertext $\text{Enc}_{WS\_a\_i}(q_{a\_i}^{(W)})$ received from an $a_i$-th one of n authentication servers to obtain a verification value $q_{a\_i}^{(W)}$, using a common key between the intermediate server and the $a_i$-th authentication server, for i=1, . . . , m, and verify whether a sum total of the verification values $q_{a\_1}^{(W)}, \ldots, q_{a\_m}^{(W)}$ is equal to 0 or not, wherein the intermediate server and the authentication server simultaneously authenticate the user apparatus.

10. A multi-party secure authentication method, wherein n is an integer equal to or larger than 3; k is an integer equal to or larger than 2; n≥3 is satisfied; 2k−1n is satisfied; $a_1, \ldots, a_m$ are m different integers each of which is equal to or larger than 1 and equal to or smaller than n; k≤m is satisfied; m≤n is satisfied; is satisfied; (k, n) secret sharing is secret sharing in which reconstruction is possible if there are k or more dispersed values among n dispersed values; $[r^{(W)}]_1, \ldots, [r^{(W)}]_n$ are such dispersed values by the (k, n) secret sharing that a random number $r^{(W)}$ is obtained when $[r^{(W)}]_1, \ldots, [r^{(W)}]_n$ are reconstructed; $[r^{(i)}]_1, \ldots, [r^{(i)}]_n$ (i=1, . . . , n) are such dispersed values by the (k, n) secret sharing that a random number $r^{(i)}$ is obtained when $[r^{(i)}]_1, \ldots, [r^{(i)}]_n$ are reconstructed; $[0^{(W)}]_1, \ldots, [0^{(W)}]_n$ are such dispersed values by the (k, n) secret sharing that 0 is obtained when $[0^{(W)}]_1, \ldots, [0^{(W)}]_n$ are reconstructed; and $[0^{(a\_i)}]_1, \ldots, [0^{(a\_i)}]_n$ (i=1, . . . , m) are such dispersed value by the (k, n) secret sharing that 0 is obtained when $[0^{(a\_i)}]_1, \ldots, [0^{(a\_i)}]_n$ are reconstructed; and the method comprises:

dispersing, with circuitry of a user apparatus, an inputted password w' into n dispersed values $[w']_1, \ldots, [w']_n$;

obtaining, with the circuitry of the user apparatus, a ciphertext $\text{Enc}_{US\_i}([w']_i)$, which is obtained by encrypting a dispersed value $[w']_i$, using a common key between the user apparatus and an i-th one of n authentication servers, for i=1, . . . , n;

transmitting, by circuitry of an intermediate server, the ciphertext $\text{Enc}_{US\_i}([w']_i)$ received from the user apparatus to the i-th authentication server, for i=1, . . . , n;

decrypting, by circuitry of an authentication server, the ciphertext $\text{Enc}_{US\_i}([w']_i)$ received from the intermediate server to obtain the dispersed value $[w']_i$, using a common key between the user apparatus and the authentication server;

determining, by the circuitry of the authentication server, a verification value $q_{a\_i}^{(W)}$ by the following formula:

$$q_{a_i}^{(W)} = \lambda_{a\_i}^{(W)}[r^{(W)}]_{a_i}[w]_{a_i} - [w']_{a_i}) + \hat{\lambda}_{a_i}^{(W)}[0^{(W)}]_{a_i}$$

wherein $\lambda_{a\_i}^{(W)}$ (i∈1, . . . , m) indicates a constant satisfying the following formula:

$$r^{(W)}w = \sum_{i=1}^{m} \lambda_{a_i}^{(W)}[r^{(W)}]_{a_i}[w]_{a_i}$$

$\hat{\lambda}_{a\_i}^{(W)}$ (i∈1, . . . , m) indicates a constant satisfying the following formula:

$$0 = \sum_{i=1}^{m} \hat{\lambda}_{a_i}^{(W)}[0^{(W)}]_{a_i}$$

$\lambda_{a\_i}^{(j)}$ (i∈1, . . . , m) indicates a constant satisfying the following formula:

$$r^{(j)}w = \sum_{i=1}^{m} \lambda_{a_i}^{(j)}[r^{(j)}]_{a_i}[w]_{a_i}$$

and $\hat{\lambda}_{a\_i}^{(j)}$ (i∈1, . . . , m) indicates a constant satisfying the following formula:

$$0 = \sum_{i=1}^{m} \hat{\lambda}_{a_i}^{(j)}[0^{(j)}]_{a_i}$$

obtaining, by the circuitry of the authentication server, a ciphertext $\text{Enc}_{WS\_a\_i}(q_{a\_i}^{(W)})$, which is obtained by encrypting the verification value $q_{a\_i}^{(W)}$, using a common key between the intermediate server and the authentication server;

decrypting, by the circuitry of the intermediate server, the ciphertext $\text{Enc}_{WS\_a\_i}(q_{a\_i}^{(W)})$ received from an $a_i$-th one of the authentication servers to obtain a verification value $q_{a\_i}^{(W)}$, using a common key between the intermediate server and the $a_i$-th authentication server, for i=1, . . . , m;

verifying, by the circuitry of the intermediate server, whether a sum total of the verification values $q_{a\_1}^{(W)}, \ldots, q_{a\_m}^{(W)}$ is equal to 0 or not;

determining, by the circuitry of the authentication server, a verification value $q_{a\_i}^{(a\_j)}$, for j=1, . . . , m, by the following formula:

$$q_{a_i}^{(a_j)} = \lambda_{a_i}^{(a_j)}[r^{(a_j)}]_{a_i}([w]_{a_i} - [w']_{a_i}) + \hat{\lambda}_{a_i}^{(a_j)}[0^{(a_j)}]_{a_i}$$

obtaining, by the circuitry of the authentication server, a ciphertext $\text{Enc}_{S\_a\_iS\_a\_j}(q_{a\_i}^{(a\_j)})$, which is obtained by encrypting the verification value $q_{a\_i}^{(a\_j)}$, using a common key between an $a_j$-th one of the authentication servers and the authentication server, for j=1, . . . , m;

decrypting, by the circuitry of the authentication server, the ciphertext $\text{Enc}_{S\_a\_iS\_a\_j}(q_{a\_j}^{(a\_i)})$ received from the $a_i$-th authentication server to obtain the verification value $q_{a\_j}^{(a\_i)}$, using the common key between the $a_j$-th authentication server and the authentication server, for j=1, . . . , m; and verifying, by the circuitry of the authentication server, whether a sum total of the verification values $q_{a\_1}^{(a\_i)}, \ldots, q_{a\_m}^{(a\_i)}$ is equal to 0 or not, wherein the authentication server and the intermediate server simultaneously authenticate the user apparatus.

11. A multi-party secure authentication method, wherein n is an integer equal to or larger than 3; k is an integer equal to or larger than 2; n≥3 is satisfied; 2k−1≤n is satisfied; $a_1, \ldots, a_m$ are m different integers each of which is equal to or larger than 1 and equal to or smaller than n, where $a_m=n$ is satisfied; k≤m is satisfied; m≤n is satisfied; (k, n) secret sharing is secret sharing in which reconstruction is possible if there are k or more dispersed values among n dispersed values; $[r^{(i)}]_1, \ldots, [r^{(i)}]_n$ (i=1, \ldots, n) are such dispersed values by the (k, n) secret sharing that a random number $r^{(i)}$ is obtained when $[r^{(i)}]_1, \ldots, [r^{(i)}]_n$ are reconstructed; and $[0^{(a\_i)}]_1, \ldots, [0^{(a\_i)}]_n$ (i=1, \ldots, m) are such dispersed values by the (k, n) secret sharing that 0 is obtained when $[0^{(a\_i)}]_1, \ldots, [0^{(a\_i)}]_n$ are reconstructed;

$\lambda_{a\_i}^{(j)}$ (i∈1, \ldots, m) indicates a constant satisfying the following formula:

$$r^{(j)}w = \sum_{i=1}^{m} \lambda_{a_i}^{(j)} [r^{(j)}]_{a_i} [w]_{a_i}$$

$\hat{\lambda}_{a\_i}^{(j)}$ (i∈1, \ldots, m) indicates a constant satisfying the following formula:

$$0 = \sum_{i=1}^{m} \hat{\lambda}_{a_i}^{(j)} [0^{(j)}]_{a_i}$$

and the method comprises:

dispersing, by circuitry of a user apparatus, an inputted password w' into n dispersed values $[w']_1, \ldots, [w']_n$;

obtaining, by the circuitry of the user apparatus, a ciphertext $Enc_{US\_i}([w']_i)$, which is obtained by encrypting a dispersed value $[w']_i$, using a common key between the user apparatus and an i-th authentication server, and obtaining a ciphertext $Enc_{US\_n}([w']_n)$, which is obtained by encrypting a dispersed value $[w']_n$, using a common key between the user apparatus and an intermediate authentication server, for i=1, \ldots, n−1;

transmitting, by circuitry of the intermediate authentication server, the ciphertext $Enc_{US\_i}([w']_i)$ received from the user apparatus to the i-th authentication server, for i=1, \ldots, n−1;

decrypting, by circuitry of the authentication server, the ciphertext $Enc_{US\_i}([w']_i)$ received from the intermediate authentication server to obtain the dispersed value $[w']_i$, using a common key between the user apparatus and the authentication server;

decrypting, by the circuitry of the intermediate authentication server, the ciphertext $Enc_{US\_n}([w']_n)$ to obtain the dispersed value $[w']_n$, using a common key between the user apparatus and the intermediate authentication server;

determining, by the circuitry of the authentication server, a verification value $q_{a\_i}^{(a\_j)}$, for j=1, \ldots, m, by the following formula:

$$q_{a_i}^{(a_j)} = \lambda_{a_i}^{(a_j)} [r^{(a_j)}]_{a_i} ([w]_{a_i} - [w']_{a_i}) + \hat{\lambda}_{a_i}^{(a_j)} [0^{(a_j)}]_{a_i}$$

determining, by the circuitry of the intermediate authentication server, a verification value $q_{a\_m}^{(a\_j)}$, for j=1, \ldots, m, by the following formula:

$$q_{a_m}^{(a_j)} = \lambda_{a_m}^{(a_j)} [r^{(a_j)}]_{a_m} ([w]_{a_m} - [w']_{a_m}) + \hat{\lambda}_{a_m}^{(a_j)} [0^{(a_j)}]_{a_m}$$

obtaining, by the circuitry of the authentication server, a ciphertext $Enc_{S\_a\_iS\_a\_j}(q_{a\_i}^{(a\_j)})$, which is obtained by encrypting the verification value $q_{a\_i}^{(a\_j)}$, using a common key between an $a_j$-th one of the authentication servers or the intermediate authentication server, and the authentication server, for j=1, \ldots, m;

obtaining, by the circuitry of the intermediate authentication server, a ciphertext $Enc_{S\_a\_mS\_a\_j}(q_{a\_m}^{(a\_j)})$, which is obtained by encrypting the verification value $q_{a\_m}^{(a\_j)}$, using a common key between the $a_j$-th authentication server and the intermediate authentication server, for j=1, \ldots, m−1;

decrypting, by the circuitry of the authentication server, a ciphertext $Enc_{S\_a\_iS\_a\_j}(q_{a\_j}^{(a\_i)})$ received from the $a_j$-th authentication server to obtain the verification value $q_{a\_j}^{(a\_i)}$, using the common key between the $a_j$-th authentication server or the intermediate authentication server, and the authentication server, for j=1, \ldots, m;

decrypting, by the circuitry of the intermediate authentication server, the ciphertext $Enc_{S\_a\_mS\_a\_j}(q_{a\_j}^{(a\_m)})$ received from the $a_j$-th authentication server to obtain the verification value $q_{a\_j}^{(a\_m)}$, using the common key between the $a_j$-th authentication server and the intermediate authentication server, for j=1, \ldots, m;

verifying, by the circuitry of the authentication server, whether a sum total of the verification values $q_{a\_1}^{(a\_i)}, \ldots, q_{a\_m}^{(a\_i)}$ is equal to 0 or not; and verifying, by the circuitry of the intermediate authentication server, whether a sum total of the verification values $q_{a\_1}^{(a\_m)}, \ldots, q_{a\_m}^{(a\_m)}$ is equal to 0 or not, wherein the authentication server and the intermediate server simultaneously authenticate the user apparatus.

12. A non-transitory computer readable medium including computer executable instructions that make an authentication server, wherein n is an integer equal to or larger than 3; k is an integer equal to or larger than 2; n≥3 is satisfied; 2k−1≤n is satisfied; $a_1, \ldots, a_m$ are m different integers each of which is equal to or larger than 1 and equal to or smaller than n; k≤m is satisfied; m≤n is satisfied; (k, n) secret sharing is secret sharing in which reconstruction is possible if there are k or more dispersed values among n dispersed values; $[r^{(W)}]_1, \ldots, [r^{(W)}]_n$ are such dispersed values by the (k, n) secret sharing that a random number $r^{(W)}$ is obtained when $[r^{(W)}]_1, \ldots, [r^{(W)}]_n$ are reconstructed; $[r^{(i)}]_1, \ldots, [r^{(i)}]_n$ (i=1, \ldots, n) are such dispersed values by the (k, n) secret sharing that a random number $r^{(i)}$ is obtained when $[r^{(i)}]_1, \ldots, [r^{(i)}]_n$ are reconstructed; $[0^{(W)}]_1, \ldots, [0^{(W)}]_n$ are such dispersed values by the (k, n) secret sharing that 0 is obtained when $[0^{(W)}]_1, \ldots, [0^{(W)}]_n$ are reconstructed; and $[0^{(a\_i)}]_1, \ldots, [0^{(a\_i)}]_n$ (i=1, \ldots, m) are such dispersed value by the (k, n) secret sharing that 0 is obtained when $[0^{(a\_i)}]_1, \ldots, [0^{(a\_i)}]_n$ are reconstructed, perform the method comprising:

storing an i-th dispersed value $[w]_i$ among dispersed values $[w]_1, \ldots, [w]_n$ obtained by dispersing a password w into n pieces, the i-th dispersed value $[r^{(W)}]_i$, and the respective i-th dispersed values $[r^{(1)}]_i, \ldots, [r^{(n)}]_i$;

decrypting a ciphertext $Enc_{US\_i}([w']_i)$ received from an intermediate server to obtain a dispersed value $[w']_i$, which is obtained by dispersing a password w' into n pieces, using a common key between a user apparatus and the authentication server;

determining a verification value $q_{a\_i}^{(W)}$ by the following formula:

$$q_{a_i}^{(W)} = \lambda_{a_i}^{(W)} [r^{(W)}]_{a_i} ([w]_{a_i} - [w']_{a_i}) + \hat{\lambda}_{a_i}^{(W)} [0^{(W)}]_{a_i}$$

wherein $\lambda_{a\_i}^{(W)}$ (i∈1, \ldots, m) indicates a constant satisfying the following formula:

$$r^{(W)}w = \sum_{i=1}^{m} \lambda_{a_i}^{(W)} [r^{(W)}]_{a_i} [w]_{a_i}$$

$\hat{\lambda}_{a\_i}^{(W)}$ (i∈1, . . . , m) indicates a constant satisfying the following formula:

$$0 = \sum_{i=1}^{m} \hat{\lambda}_{a_i}^{(W)} [0^{(W)}]_{a_i}$$

$\lambda_{a\_i}^{(j)}$ (i∈1, . . . , m) indicates a constant satisfying the following formula:

$$r^{(j)}w = \sum_{i=1}^{m} \lambda_{a_i}^{(j)} [r^{(j)}]_{a_i} [w]_{a_i}$$

and $\hat{\lambda}_{a\_i}^{(j)}$ (i∈1, . . . , m) indicates a constant satisfying the following formula:

$$0 = \sum_{i=1}^{m} \hat{\lambda}_{a_i}^{(j)} [0^{(j)}]_{a_i}$$

obtaining a ciphertext $\text{Enc}_{WS\_a\_i}(q_{a\_i}^{(W)})$, which is obtained by encrypting the verification value $q_{a\_i}^{(W)}$, using a common key between the intermediate server and the authentication server;

determining a verification value $q_{a\_i}^{(a\_j)}$, for j=1, . . . , m, by the following formula:

$$q_{a_i}^{(aj)} = \lambda_{a_i}^{(aj)} [r^{(aj)}]_{a_i} ([w]_{a_i} - [w']_{a_i}) + \hat{\lambda}_{a_i}^{(aj)} [0^{(aj)}]_{a_i}$$

obtaining a ciphertext $\text{Enc}_{S\_a\_iS\_a\_j}(q_{a\_i}^{(a\_j)})$, which is obtained by encrypting the verification value $q_{a\_i}^{(a\_j)}$, using a common key between an $a_j$-th authentication server and the authentication server, for j=1, . . . , m;

decrypting the ciphertext $\text{Enc}_{S\_a\_iS\_a\_j}(q_{a\_j}^{(a\_i)})$ received from the $a_j$-th authentication server to obtain the verification value $q_{a\_j}^{(a\_i)}$, using the common key between the $a_j$-th authentication server and the authentication server, for j=1, . . . , m; and verifying whether a sum total of the verification values $q_{a\_1}^{(a\_i)}, \ldots, q_{a\_m}^{(a\_i)}$ is equal to 0 or not, wherein the authentication server and the intermediate server simultaneously authenticate the user apparatus.

13. A non-transitory computer readable medium including computer executable instructions that make an intermediate server, wherein n is an integer equal to or larger than 3; k is an integer equal to or larger than 2; n≥3 is satisfied; 2k−1≤n is satisfied; k≤m is satisfied; m≤n is satisfied; and $a_1, \ldots, a_m$ are in different integers each of which is equal to or larger than 1 and equal to or smaller than n, perform the method comprising:

transmitting a ciphertext $\text{Enc}_{US\_i}([w']_i)$ received from a user apparatus to an i-th authentication server, for i=1, . . . , n;

decrypting a ciphertext $\text{Enc}_{WS\_a\_i}(q_{a\_i}^{(W)})$ received from an $a_i$-th one of n authentication servers to obtain a verification value $q_{a\_i}^{(W)}$, using a common key between the intermediate server and the $a_i$-th authentication server, for i=1, . . . , m; and verifying whether a sum total of the verification values $q_{a\_1}^{(W)}, \ldots, q_{a\_m}^{(W)}$ is equal to 0 or not, wherein the authentication servers and the intermediate server simultaneously authenticate the user apparatus.

* * * * *

UNITED STATES PATENT AND TRADEMARK OFFICE
CERTIFICATE OF CORRECTION

PATENT NO. : 9,992,190 B2
APPLICATION NO. : 14/910808
DATED : June 5, 2018
INVENTOR(S) : Ryo Kikuchi et al.

Page 1 of 1

It is certified that error appears in the above-identified patent and that said Letters Patent is hereby corrected as shown below:

In the Claims

Column 28, Line 17, Claim 1, change "obtaining" to --obtain--

Column 28, Line 21, Claim 1, change "determining" to --determine--

Column 28, Line 25, Claim 1, change "obtaining" to --obtain--

Column 28, Line 42, Claim 2, "the authentication server further comprises:" should read --the circuitry of the authentication server further configured to:--

Column 28, Line 43, Claim 2, change "generating" to --generate--

Column 28, Line 44, Claim 2, change "obtaining" to --obtain--

Column 28, Line 63, Claim 2, change "obtains" to --obtain--

Column 29, Line 5, Claim 3, "generating part generating the dispersed…" should read --generate the dispersed…--

Column 29, Line 7, Claim 3, "generating part generating the dispersed…" should read --generate the dispersed…--

Signed and Sealed this
Twenty-sixth Day of March, 2019

Andrei Iancu
*Director of the United States Patent and Trademark Office*